US012092477B2

(12) United States Patent
Fujiyoshi

(10) Patent No.: US 12,092,477 B2
(45) Date of Patent: Sep. 17, 2024

(54) DISPLAY DEVICE AND CONTROL PROGRAM

(71) Applicant: MICWARE CO., LTD., Hyogo (JP)

(72) Inventor: Masaya Fujiyoshi, Hyogo (JP)

(73) Assignee: MICWARE CO., LTD., Hyogo (JP)

( * ) Notice: Subject to any disclaimer, the term of this patent is extended or adjusted under 35 U.S.C. 154(b) by 197 days.

(21) Appl. No.: 17/868,651

(22) Filed: Jul. 19, 2022

(65) Prior Publication Data

US 2022/0364881 A1 Nov. 17, 2022

Related U.S. Application Data

(63) Continuation of application No. PCT/JP2021/003268, filed on Jan. 29, 2021.

(30) Foreign Application Priority Data

Jan. 31, 2020 (JP) .................. 2020-015659
Aug. 31, 2020 (JP) .................. 2020-145701

(51) Int. Cl.
*G01C 21/00* (2006.01)

(52) U.S. Cl.
CPC ................ *G01C 21/3841* (2020.08)

(58) Field of Classification Search
CPC ............ G01C 21/3667; G01C 21/367; G01C 21/3867; G01C 21/3896; G01C 21/3841; G06F 16/29
See application file for complete search history.

(56) References Cited

U.S. PATENT DOCUMENTS

| 10,558,824 | B1 * | 2/2020 | Remington | H04L 67/02 |
| 2004/0102197 | A1 * | 5/2004 | Dietz | H04W 4/00 455/456.2 |
| 2013/0080504 | A1 * | 3/2013 | Maurer | G09B 29/006 709/203 |
| 2013/0346855 | A1 * | 12/2013 | Appleton | G01C 21/3667 715/273 |
| 2014/0340419 | A1 * | 11/2014 | Otero | G01C 21/3667 345/619 |

(Continued)

FOREIGN PATENT DOCUMENTS

| JP | H4-45476 A | 2/1992 |
| JP | 2002-107168 A | 4/2002 |
| JP | 2003-057045 A | 2/2003 |

(Continued)

OTHER PUBLICATIONS

Kanya Srinisavan, "HTML5 Geolocation", published: Sep. 12, 2013, page: pp. 1-17 (Year: 2013).*

(Continued)

*Primary Examiner* — Wilson W Tsui
(74) *Attorney, Agent, or Firm* — Nakanishi IP Associates, LLC

(57) ABSTRACT

A display device includes a display that displays a map based on map data and Hypertext Markup Language data, a communicator that obtains the map data through Hypertext Transfer Protocol communication, and a display controller that updates, based on the map data obtained by the communicator and corresponding to location data obtained at predetermined time intervals, the map displayed on the display.

7 Claims, 13 Drawing Sheets

(56) References Cited

U.S. PATENT DOCUMENTS

| | | | |
|---|---|---|---|
| 2016/0203163 A1 | | 7/2016 | Cadell et al. |
| 2018/0113794 A1 | * | 4/2018 | Yang .................. G06F 9/54 |

FOREIGN PATENT DOCUMENTS

| | | | |
|---|---|---|---|
| JP | 2004-272880 A | | 9/2004 |
| JP | 2007-531004 A | | 11/2007 |
| JP | 2009-121879 A | | 6/2009 |
| JP | 2009-198391 A | | 9/2009 |
| JP | 2009-282307 A | | 12/2009 |
| JP | 2012-008069 A | | 1/2012 |
| JP | 2014-173862 A | | 9/2014 |
| KR | 20190026395 A | * | 3/2019 |

OTHER PUBLICATIONS

Wilson Rothman, "Turn by Turn GPS comes to the Web Browser", published: Dec. 14, 2011, pp. 1-4 (Year: 2011).*

International Search Report issued in PCT/JP2021/003268 mailed on Apr. 20, 2021 (ISR) with English Translation (7 pages).

Written Opinion of International Searching Authority issued in PCT/JP2021/003268 mailed on Apr. 20, 2021(WOSA) with English Translation (7 pages).

Office Action issued in Japanese Patent Application No. 2021-012135 mailed on Apr. 23, 2021(JP OA) with English Translation (6 pages).

"Explanation ImplementationTechnology High-Speed Deep Neural Network Without Application, Image Lab Jun. 2018 Issue" Jun. 10, 2018, vol. 29, No. 6, pp. 24-30, ISSN:0915-6755, pp. 24-30, (Hidaka, Masatoshi et al., "Commentary: Fast Deep Neural Network without Installation of Application", Image Laboratory Jun. 2018 issue) (7 pages) (cited in ISR, WOSA, and JP OA).

Office Action issued in Japanese Patent Application No. 2021-184834 mailed on Jan. 24, 2023 with English Translation (6 pages).

Extended European Search Report issued in European Patent Application No. 21748232.2, mailed on Feb. 21, 2024 (11 pages).

\* cited by examiner https://●●●●.co.jp/■■■/▲▲?xxxxx  1004

DISPLAY DEVICE AND CONTROL PROGRAM

CROSS-REFERENCE TO RELATED APPLICATIONS

This application is a continuation application of International Patent Application No. PCT/JP2021/003268 filed on Jan. 29, 2021, which claims priority to Japanese Patent Application No. 2020-015659 filed on Jan. 31, 2020 and Japanese Patent Application No. 2020-145701 filed on Aug. 31, 2020, the entire contents of which are incorporated by reference.

BACKGROUND OF INVENTION

Field of the Invention

The present invention relates to a display device and a control program.

Background Art

Patent Literature 1 describes a map display device that displays a map on a screen with visibility improved by using different display forms for the map displayed on the screen. The map display device described in Patent Literature 1 displays a map on the screen based on the device location information. The map display device more clearly displays a predetermined-width range along an identified path in the map on the screen. The map display device faintly displays the area other than the predetermined-width range in the map on the screen. The map display device is implemented by, for example, a mobile phone, a personal digital assistant (PDA), or a personal computer (PC).

A map display device such as a car navigation system updates the map at predetermined time intervals in accordance with the device location information. With a low frequency of map updates, the map display device cannot smoothly update the map displayed on the screen. This is because a lower update frequency tends to cause the map on the screen to be altered more greatly per update and rendered laggingly on the screen upon an update. Such a map is difficult for the user to visually confirm. This phenomenon often occurs in a mode in which the device location information is indicated by a location icon fixed at a predetermined location on the screen, and a map of an area surrounding the location icon changes with the device movement. This mode will be hereafter referred to as a current-location display mode. The predetermined location at which the location icon is fixed is, for example, the center of the screen.

Additionally, the map display device with a low frequency of map updates may not move the location icon smoothly. More specifically, the location icon appears at a location at some distance from the previous location. In this case, the map display device causes the user to experience a sudden jump of the location icon from one location to another. Such a phenomenon tends to occur in a mode in which the map on the screen is user-scrollable, and the location icon moves on the screen with the device movement. This mode will be hereafter referred to as a current-location moving mode.

In contrast, the map display device with a high frequency of map updates alters the map slightly per update. The location icon also moves by a smaller distance per update. Thus, the map display device with a high frequency of map updates can smoothly update the map on the screen. The map display device can also smoothly move the location icon.

However, for the map display device with a higher frequency of map updates, rendering a map on the screen has a higher occupancy rate of the computing time. As the occupancy rate increases, the time allotted to the processing other than map rendering decreases. Thus, the map display device with a high frequency of map updates cannot readily perform processing such as scaling up or down the map on the screen and altering the map. This reduces the convenience of the user.

As a technique to respond to the issue, Patent Literature 2 describes a rendering update control device that uses the scale of the map on the screen and the speed of the user's vehicle to determine whether the rendered map is to be updated, and updates the rendered map when the rendered map is determined to be updated.

The rendering update control device described in Patent Literature 2 can avoid unintended updates and reduce the frequency of rendered map updates. The rendering update control device can lower the update frequency to reduce the map rendering load.

CITATION LIST

Patent Literature

Patent Literature 1: Japanese Unexamined Patent Application Publication No. 2003-57045
Patent Literature 2: Japanese Unexamined Patent Application Publication No. 2014-173862

SUMMARY OF INVENTION

No techniques are known for obtaining map data through Hypertext Transfer Protocol (HTTP) communication and using a web browser to update a map based on the obtained map data for the purpose of navigation. HTTP communication is usually used between web servers and web browsers. In the future, web browsers will be preinstalled on various terminals such as smart meters and car navigation systems, in addition to PCs and mobile terminals. Systems with web browsers can cooperate with web services on the cloud to create novel services. Techniques are awaited for updating a map on a screen using HTTP or another communication protocol that allows communication with a web browser to create novel services.

One or more aspects of the present invention are directed to a display device and a control program for updating a map displayed on a screen using HTTP or another communication protocol for communication with a web server.

A display device according to one aspect of the present invention includes a display, a communicator, and a display controller. The display displays a map based on map data and Hypertext Markup Language data. The communicator obtains the map data. The communicator uses a communication protocol for communication with a web server. The display controller updates the map based on the map data. The map is displayed on the display using the Hypertext Markup Language data. The map data is obtained by the communicator. The communicator obtains the map data corresponding to location data. The communicator obtains the location data at predetermined time intervals.

Advantageous Effects

The display device and the control program according to one or more aspects of the present invention update a map displayed on a screen using HTTP or another communication protocol for communication with a web server.

DETAILED DESCRIPTION

Figure 1:
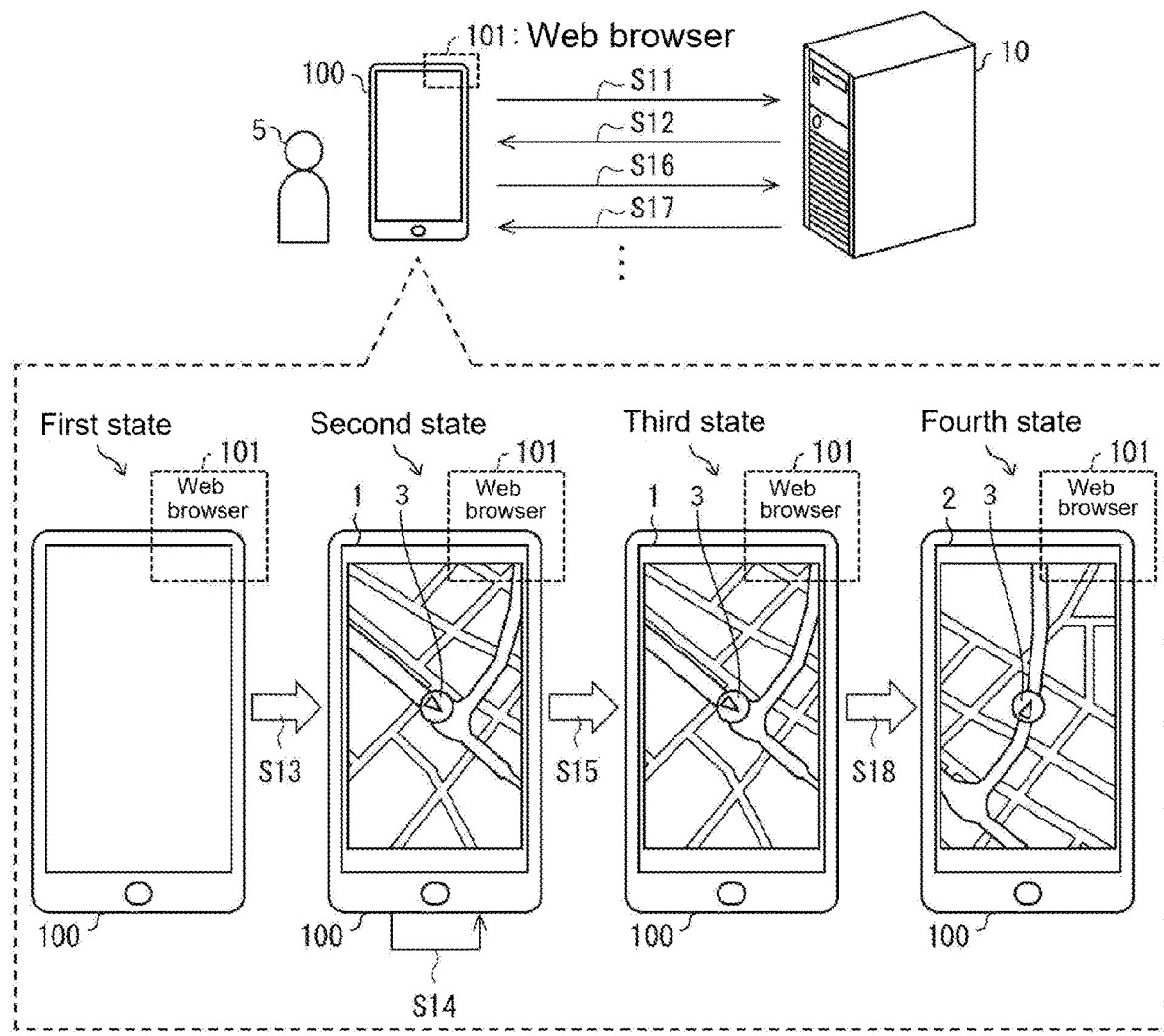
FIG. 1 is a diagram showing an example display process performed by a user terminal according to a first embodiment.

Embodiments of the present invention will now be described with reference to the drawings. In each embodiment, the same components are given the same reference numerals and will not be described repeatedly.

First Embodiment

1. Display Processing

FIG. 1 is a diagram showing an example display process performed by a display device according to a first embodiment of the present invention. FIG. 1 illustrates example processing performed by a control program according to the present embodiment in the display device according to the present embodiment.

More specifically, FIG. 1 shows an example in which a user terminal 100 that is an example display device according to the present embodiment displays a first map 1 and a second map 2 in this order. In more detail, the user terminal 100 performs the processing of obtaining map data for the first map 1. The user terminal 100 performs the processing of rendering the obtained map data for the first map 1. The first map 1 appears on the screen of the user terminal 100.

Before the processing of obtaining map data for the second map 2, the user terminal 100 determines the interval that is an intervening time to the start of the processing of obtaining the map data for the second map 2. After the interval, the user terminal 100 performs the processing of obtaining the map data for the second map 2. The user terminal 100 performs the processing of rendering based on the obtained map data. The second map 2 appears on the screen of the user terminal 100.

The first map 1 and the second map 2 in the example described below are maps of an area surrounding a user 5 using the user terminal 100. For example, in FIG. 1, the map displayed on the screen of the user terminal 100 is updated by the processing performed by the user terminal 100. The map is updated in accordance with the movement of the user 5. In the example of FIG. 1, the first map 1 is updated with the second map 2. The first map 1 and the second map 2 each indicate the location of the user 5 with a location icon 3. The location icon 3 appears at the position corresponding to the location data about the user 5. The location data about the user 5 is also the location data about the user terminal 100 carried by the user 5.

Updating the map herein refers to updating the rendering processing performed to display a map on the screen. More specifically, updating the map refers to performing the rendering processing again.

The present embodiment will be described with reference to an example of the processing of displaying the first map 1 and the second map 2 performed in a current-location display mode. In the present embodiment, the processing of obtaining map data is performed at a predetermined frequency although no map updating is to be performed. No map updating is to be performed when, for example, the user 5 is stationary and the map on the screen is not to be altered.

The user terminal 100 is a mobile terminal. The user terminal 100 communicates with any server through a wireless communication network. The user terminal 100 may be, for example, a personal computer (PC), a smartphone, a tablet, or an in-vehicle navigator. The user terminal 100 includes a screen such as a liquid crystal display. For example, the user terminal 100 includes a touchscreen. The user 5 touches the screen with a finger or a stylus to operate the user terminal 100.

A movable object in the present embodiment is the user 5, who is a human. Other examples of movable objects in the present embodiment include a vehicle or a train.

The user terminal 100 includes a web browser 101 installed. The user terminal 100 transmits and receives information to and from a content delivery server 10 through Hypertext Transfer Protocol (HTTP) communication. The HTTP communication is implemented by the function of the web browser 101. More specifically, a user action on the user terminal 100 is performed through the web browser 101, and an HTTP request is transmitted to the content delivery server 10. The content delivery server 10 performs server processing in accordance with the HTTP request and returns an HTTP response to the user terminal 100 after the completion of the requested processing. The user terminal 100 may use any communication protocol for communication with the content delivery server 10 in place of HTTP communication. For example, the user terminal 100 may use Hypertext Transfer Protocol Secure (HTTPS) communication.

The content delivery server 10 delivers map data to the user terminal 100. The map data delivered by the content delivery server 10 includes, for example, predetermined map image information to be displayed and road network information that includes link information, node information, and link-to-link connection information. In the example of FIG. 1, the content delivery server 10 delivers the map data for the first map 1 and the map data for the second map 2 as example map data to the user terminal 100.

In addition to the map data, the content delivery server 10 delivers HTML data for map display, design image data, and program data to the user terminal 100. The HTML data is data written in HTML to display a map on the screen. The design image data is image data linked with the HTML data and displayed on the screen in accordance with the HTML data. The program data is control program data that allows the user terminal 100 to perform map rendering and navigation functions.

Referring to FIG. 1, the display process performed by the user terminal 100 will now be described. The state transition of the screen of the user terminal 100 is shown as a first state, a second state, a third state, and a fourth state in this order from the left in the figure.

In step S11, the screen of the user terminal 100 is in the first state. In the first state, the user terminal 100 requests the content delivery server 10 to deliver the map data for the first map 1 based on the location data about the user 5. The map data for the first map 1 corresponds to the current location data about the user 5. More specifically, the map data for the first map 1 is map data representing an area surrounding the current location of the user 5. In step S12, the content delivery server 10 delivers the map data for the first map 1 in response to the request from the user terminal 100.

The user terminal 100 obtains the map data for the first map 1. In step S13, the user terminal 100 displays the first map 1 on the screen of the user terminal 100 based on the obtained map data. The processing in step S13 shifts the screen of the user terminal 100 to the second state.

In step S14, the screen of the user terminal 100 is in the second state. In the second state, the user terminal 100 determines the interval to the start of the processing of obtaining the map data for the second map 2. In step S14, the user terminal 100 obtains speed data and scale data. The speed data indicates the speed of the moving user 5. The scale data indicates the map scale used for displaying the second map 2. In obtaining the map data for the first map 1, for example, the user terminal 100 uses the Global Positioning System (GPS) capability of the user terminal 100 to obtain the speed data. In obtaining the map data for the first map 1, for example, the user terminal 100 obtains the map scale data set in the user terminal 100.

The user terminal 100 uses the obtained speed data and scale data, and also a predetermined parameter to determine the above interval. The user terminal 100 determines the interval in the manner described later.

In step S15, the user terminal 100 waits for the processing of obtaining the map data for the second map 2 until the interval determined in step S14 elapses. The processing in step S15 shifts the screen of the user terminal 100 to the third state. Each of the map displayed on the screen in the second state and the map displayed on the screen in the third state is the first map 1.

In step S16, after the interval determined in step S14, the user terminal 100 in the third state requests the content delivery server 10 to deliver the map data for the second map 2 based on the location data about the user 5. The map data for the second map 2 corresponds to the current location data about the user 5. More specifically, the map data for the second map 2 is map data representing an area surrounding the current location of the user 5. In step S17, the content delivery server 10 delivers the map data for the second map 2 in response to the request from the user terminal 100.

In step S18, the user terminal 100 obtains the map data for the second map 2. The user terminal 100 renders the obtained map data and displays the second map 2 on the screen of the user terminal 100. The processing in step S18 shifts the screen of the user terminal 100 to the fourth state.

The user terminal 100, which performs the above display processing, will be described in detail below.

2. System Configuration

Figure 2:
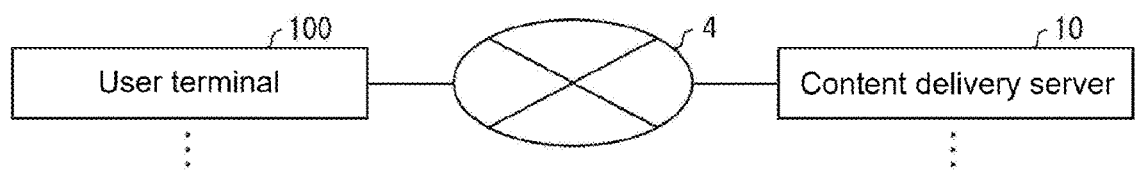
FIG. 2 is a diagram of an example system with the configuration in the first embodiment.

Referring to FIG. 2, the system configuration in the present embodiment will be described. FIG. 2 is a diagram of an example system with the configuration in the present embodiment. As shown in FIG. 2, the system in the present embodiment includes the user terminal 100 and the content delivery server 10. The user terminal 100 and the content delivery server 10 are connected together through a network 4 to allow wired or wireless communication. The system shown in FIG. 2 may include any number of devices. For example, the system in the present embodiment may include multiple user terminals 100. For example, the system in the present embodiment may include multiple content delivery servers 10.

3. Configuration of Content Delivery Server

Figure 3:
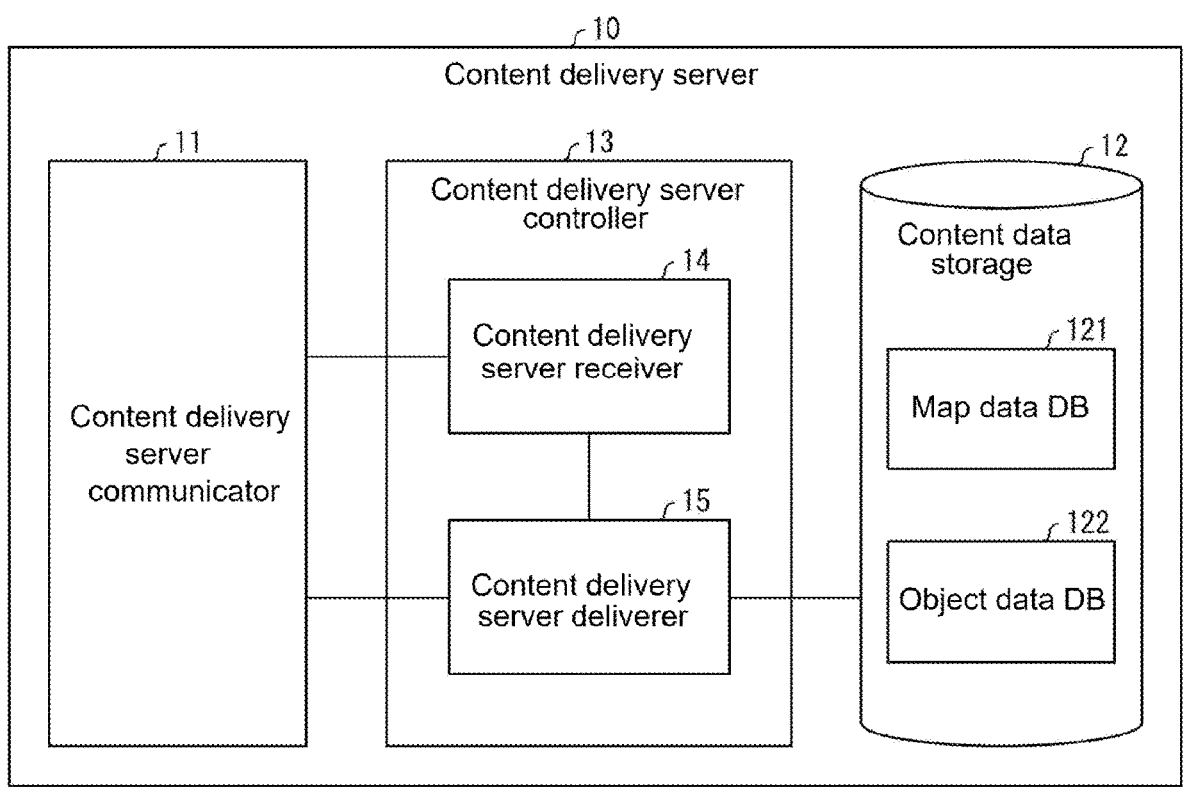
FIG. 3 is a diagram of a content delivery server in the first embodiment showing an example configuration.

Referring to FIG. 3, the configuration of the content delivery server 10 will now be described. FIG. 3 is a diagram of the content delivery server 10 showing an example configuration. As shown in FIG. 3, the content delivery server 10 includes a content delivery server communicator 11, a content data storage 12, and a content delivery server controller 13. The content delivery server 10 corresponds to a first server.

The content delivery server communicator 11 is implemented by, for example, a network interface card (NIC). The content delivery server communicator 11 is connected to the network 4 shown in FIG. 2 in a wired or wireless manner. The content delivery server communicator 11 transmits and receives information to and from the user terminal 100.

The content data storage 12 is implemented by a storage device. Examples of the storage device include a hard disk drive, an optical disc, or a semiconductor memory device such as a random-access memory (RAM) or a flash memory.

The content data storage 12 stores a map data DB 121 and an object data DB 122. The content delivery server 10 retrieves, from the map data DB 121, the map data for the map requested by the user terminal 100. The content delivery server 10 delivers the retrieved map data to the user terminal 100. The map data DB 121 may accumulate object information and object images. The object information is information about objects such as major buildings, landmarks, and the buildings of banks, post offices, schools, hospitals, and other organizations. The object images are, for example, icon images representing the objects. The user terminal 100 displays the map data delivered from the content delivery server 10 onto the web browser 101 and refers to the object information to display object images at predetermined locations on the map.

The object data DB 122 is a database that accumulates design image data. The design image data accumulated in the object data DB 122 is image data not included in typical map data. For example, the design image data is image data representing a sign, a character, or an indicator serving as an operation guide to the user 5. The user terminal 100 obtains the design image data from the content delivery server 10. The user terminal 100 displays the map including the design image data onto the screen.

The content data storage 12 may also store HTML data for map display and control program data.

The content delivery server controller 13 is implemented by, for example, a central processing unit (CPU) or a microprocessing unit (MPU). The CPU or the MPU executes various programs stored in the predetermined storage device inside the content delivery server 10 using the RAM as a work area. The content delivery server controller 13 is also implemented by, for example, a semiconductor integrated circuit such as an application-specific integrated circuit (ASIC) or a field-programmable gate array (FPGA).

As shown in FIG. 3, the content delivery server controller 13 includes a content delivery server receiver 14 and a content delivery server deliverer 15. The content delivery server controller 13 implements or produces the function and the effect of the information processing described later. The internal configuration of the content delivery server controller 13 may not be the configuration shown in FIG. 3 but may be any other configuration that allows the information processing described later. The processing units of the content delivery server controller 13 may be connected in a manner other than shown in FIG. 3.

The content delivery server receiver 14 receives a map data delivery request from the user terminal 100. For example, the content delivery server receiver 14 receives an HTTP request as a map data delivery request.

When the content delivery server receiver 14 receives a map data delivery request, the content delivery server deliverer 15 delivers the map data requested to be delivered to the user terminal 100. More specifically, the content delivery server deliverer 15 retrieves the map data requested to be delivered from the map data DB 121 stored in the content data storage 12, and delivers the retrieved map data to the user terminal 100.

4. User Terminal Configuration

Figure 4:
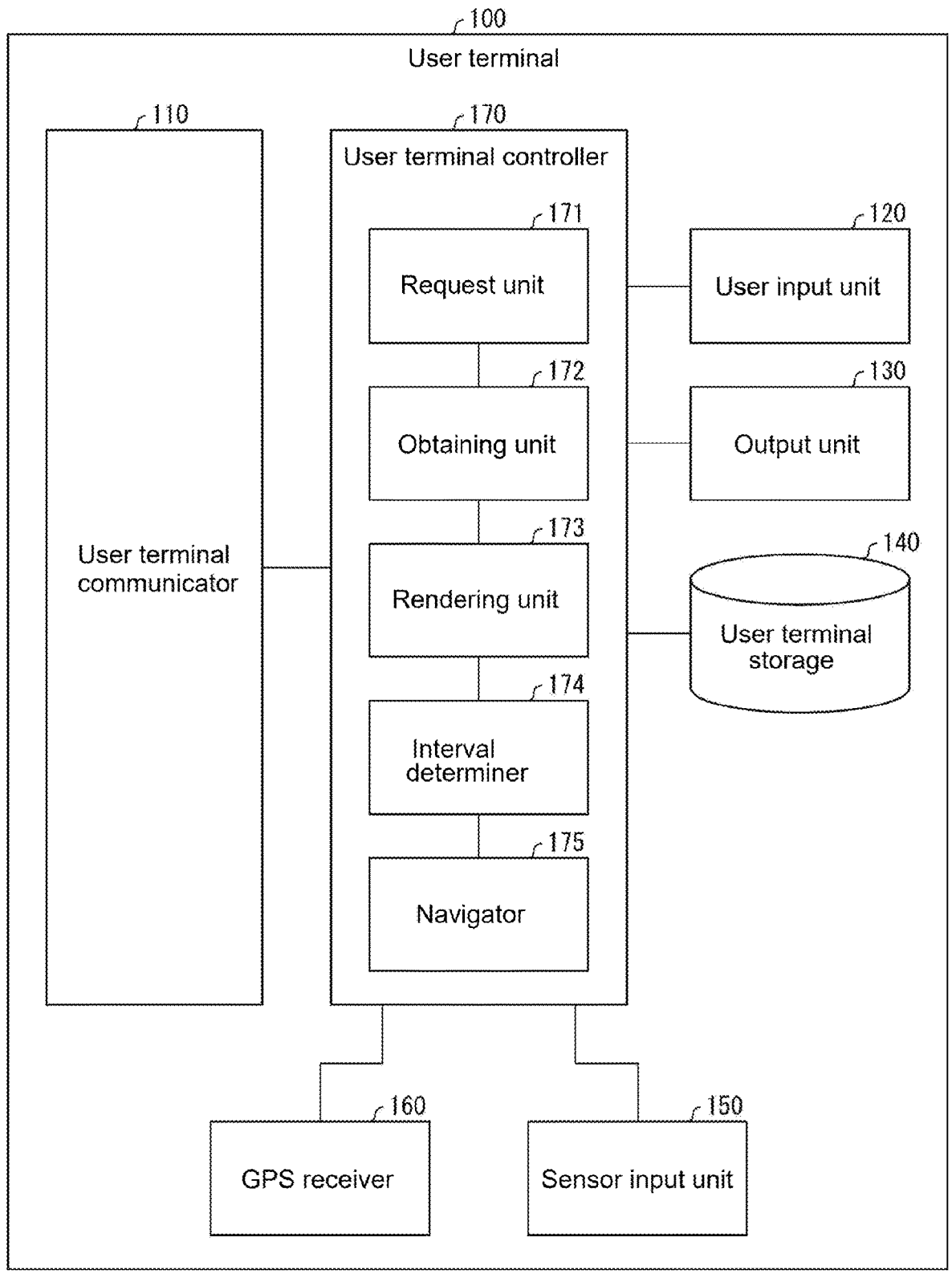
FIG. 4 is a diagram of the user terminal according to the first embodiment showing an example configuration.

Referring to FIG. 4, the configuration of the user terminal 100 will now be described. FIG. 4 is a diagram of the user terminal 100 showing an example configuration. As shown in FIG. 4, the user terminal 100 includes a user terminal communicator 110, a user input unit 120, an output unit 130, a user terminal storage 140, a sensor input unit 150, a GPS receiver 160, and a user terminal controller 170.

The user terminal communicator 110 is implemented by, for example, an NIC. The user terminal communicator 110 is connected to the network 4 shown in FIG. 2 in a wired or wireless manner. The user terminal communicator 110 transmits and receives information to and from the content delivery server 10.

More specifically, when the map displayed on the screen of the user terminal 100 is updated, the user terminal communicator 110 receives map data at a predetermined frequency. The predetermined frequency corresponds to the interval determined by an interval determiner 174. The user terminal communicator 110 corresponds to a communication obtainer.

The user input unit 120 is an input device that receives various operations from the user. For example, the user input unit 120 is implemented by a keyboard, a mouse, or operation keys. The output unit 130 is a device that displays various information items. For example, the output unit 130 is the screen of the user terminal 100. The output unit 130 is implemented by, for example, a liquid crystal display. For a touchscreen user terminal 100, the user input unit 120 and the output unit 130 are integrated into a single unit. The output unit 130 corresponds to a display.

The map may not be displayed in a full-screen mode on the output unit 130, which is the screen of the user terminal 100. The map may appear in the window of the web browser 101 displayed on the output unit 130. In this case, the display area of the user terminal 100 for map display refers to the window of the web browser 101. In the example described below, the display area of the user terminal 100 refers to the window of the web browser 101.

The user terminal storage 140 is implemented by a storage device. Examples of the storage device include a hard disk drive, an optical disc, or a semiconductor memory device such as a RAM or a flash memory. The user terminal storage 140 stores various information items. The user terminal storage 140 stores various programs executable by the user terminal 100. The user terminal storage 140 stores the above control program temporarily. The control program is software that allows the web browser 101 to display a webpage. The user terminal storage 140 may store the current map scale data temporarily.

The sensor input unit 150, for example, obtains the angular velocity measured by a gyroscope sensor and the acceleration measured by an acceleration sensor. In the measurement with the GPS receiver 160 (described later), the user terminal controller 170 can use the angular velocity and the acceleration obtained by the sensor input unit 150 to improve the accuracy in measuring the location data about the user 5. The sensor input unit 150 may not be included in the user terminal 100.

The GPS receiver 160 causes a GPS sensor (not shown) to receive radio waves from GPS satellites. The GPS receiver 160 uses the radio waves received by the GPS sensor to measure the location data indicating the current location of the user 5 operating the user terminal 100. The location data is, for example, latitude and longitude information. The GPS receiver 160 performs location measurement at predetermined time intervals. The predetermined time interval is, for example, one second. The GPS receiver 160 detects the speed of the user 5. The speed of the user 5 is also the speed of the user terminal 100 carried by the user 5.

The user terminal controller 170 is implemented by, for example, a CPU or an MPU. The CPU or the MPU executes various programs stored in the storage device inside the user terminal 100 using the RAM as a work area. The various programs are examples of the control program according to the present embodiment. For example, the various programs correspond to the web browser 101. The user terminal controller 170 is implemented by, for example, a semiconductor integrated circuit such as an ASIC or an FPGA.

As shown in FIG. 4, the user terminal controller 170 includes a request unit 171, an obtaining unit 172, a rendering unit 173, the interval determiner 174, and a navigator 175. The user terminal controller 170 implements or produces the function and the effect of the information processing described later. The internal configuration of the user terminal controller 170 may not be the configuration shown in FIG. 4 but may be any other configuration that allows the information processing described later. The processing units of the user terminal controller 170 may be connected in a manner other than shown in FIG. 4.

The request unit 171 requests the content delivery server 10 to deliver map data. The obtaining unit 172 obtains the map data. More specifically, the obtaining unit 172 obtains the map data from the content delivery server 10 that has responded to the map data delivery request transmitted by the request unit 171.

The rendering unit 173 causes the output unit 130, which is the screen of the user terminal 100, to display the map based on the map data obtained by the obtaining unit 172.

The interval determiner 174 obtains the speed data about the user 5 from the GPS receiver 160. The interval determiner 174 also obtains the map scale data from the predetermined storage device in the user terminal 100.

The interval determiner 174 determines the interval in the manner described below.

The interval determiner 174 first estimates a movement distance per unit time in the display area. The movement distance per unit time in the display area is the distance by which a predetermined location in the map moves per unit time in the display area. Unless otherwise specified, the movement distance per unit time in the display area will be referred to as a display area movement distance or simply the movement distance.

The predetermined location in the current-location display mode is, for example, the location displaying a building or a road near the user terminal 100. In this case, the display area movement distance is the distance by which the location displaying a building or a road in the display area moves per unit time. The predetermined location in a current-location moving mode is, for example, the location of the displayed icon representing the user terminal 100. In this case, the display area movement distance is the distance by which the icon moves in the display area per unit time.

The interval determiner 174 estimates the display area movement distance based on the speed of the user 5 and the map scale. The interval determiner 174 estimates the display area movement distance based on Formula 1:

Display area movement distance=Speed of user
 5×Unit time×Map scale     (1).

The interval determiner 174 then determines the interval using the display area movement distance estimated based on Formula 1. The interval is the intervening time to the next rendering update. The interval is set to achieve smooth map rendering. More specifically, the interval is set as a time interval that allows the map on the screen to be updated smoothly. In the example of FIG. 1, as described above, the interval is the time interval from the appearance of the first map 1 to the start of the processing of obtaining the map data for the second map 2.

The interval determiner 174 determines the interval based on Formula 2:

Interval=Movement distance to achieve smooth map
 rendering/Display area movement distance     (2).

The movement distance to achieve smooth map rendering is a movement distance that allows the map to appear transitioning smoothly to the user 5 viewing the user terminal 100. In some cases, the movement distance to achieve smooth map rendering is a movement distance that allows the icon representing the user terminal 100 to appear transitioning smoothly to the user 5 viewing the user terminal 100. The movement distance to achieve smooth map rendering is a value set based on the size of the display area and the scale of the map. The movement distance to achieve smooth map rendering may be set also based on the state of the portion displayed on the map. Specific examples of the state of the portion displayed on the map include the number of buildings and the number of roads, or displaying more or fewer buildings or roads.

An example of estimating the display area movement distance and determining the interval will now be described in detail.

In this example, the map scale is 1/5,000, the speed of the user 5 is 90 km/h, the unit time is 1 second (s), and the movement distance to achieve smooth map rendering is 0.1 cm·s.

First, the display area movement distance is estimated as follows:

Display area movement distance = 90 km/h × 1 s × 1/5,000

= 25,000 cm/s × 1 s × 0.0002

= 0.5 cm.

Next, the interval is determined as follows:

Interval = 0.1 cm·s/0.5 cm

= 0.2 s.

In this manner, the interval determiner 174 estimates the display area movement distance. The interval determiner 174 also determines the interval. When the speed of the user 5 is zero, or in other words, the user terminal 100 is stationary, the value of Formula 1 is zero. When the value of Formula 1 is zero, the value of Formula 2 is infinite. In this case, although the interval is infinite, the interval having an infinite length is impractical. Thus, when the speed of the user 5 is zero or lower than or equal to a predetermined speed, the interval determiner 174 determines the interval as a predetermined intervening time. The interval determiner 174 and the rendering unit 173 correspond to a display controller.

The user terminal 100 obtains map data at determined intervals to receive the map data at a frequency corresponding to the distance by which the user 5 moves. More specifically, the user terminal 100 can receive map data at a frequency corresponding to the distance between a position indicated by the previously obtained location data and a position indicated by the subsequently obtained location data. In this manner, the interval determiner 174 and the rendering unit 173 can update the map on the output unit 130 based on the map data obtained by the user terminal communicator 110 and corresponding to the location data representing the current location of the user 5.

The navigator 175 has the guide function of guiding the user 5 from the current location of the user terminal 100 to the destination. The navigator 175 also has the search function of searching for a desired location or a desired facility. However, these functions are known and will not be described. The navigator 175 is a processing unit that may not be included in the user terminal controller 170. The functions of the navigator 175 may be implemented by, for example, the content delivery server 10.

For example, the navigator 175 performs map matching between the location data about the user 5 and the map data delivered from the content delivery server 10. The map matching is performed to determine the current location of the user terminal 100. The navigator 175 also searches for and sets a guide route from the current location to the destination set by the user 5. The navigator 175 provides a guide for traveling along the set guide route. The guide is provided to the user 5 using, for example, a guide voice and an icon displayed on the map. Each time the map is updated, the navigator 175 displays the set guide route on the updated map.

5. Process

Figure 5:
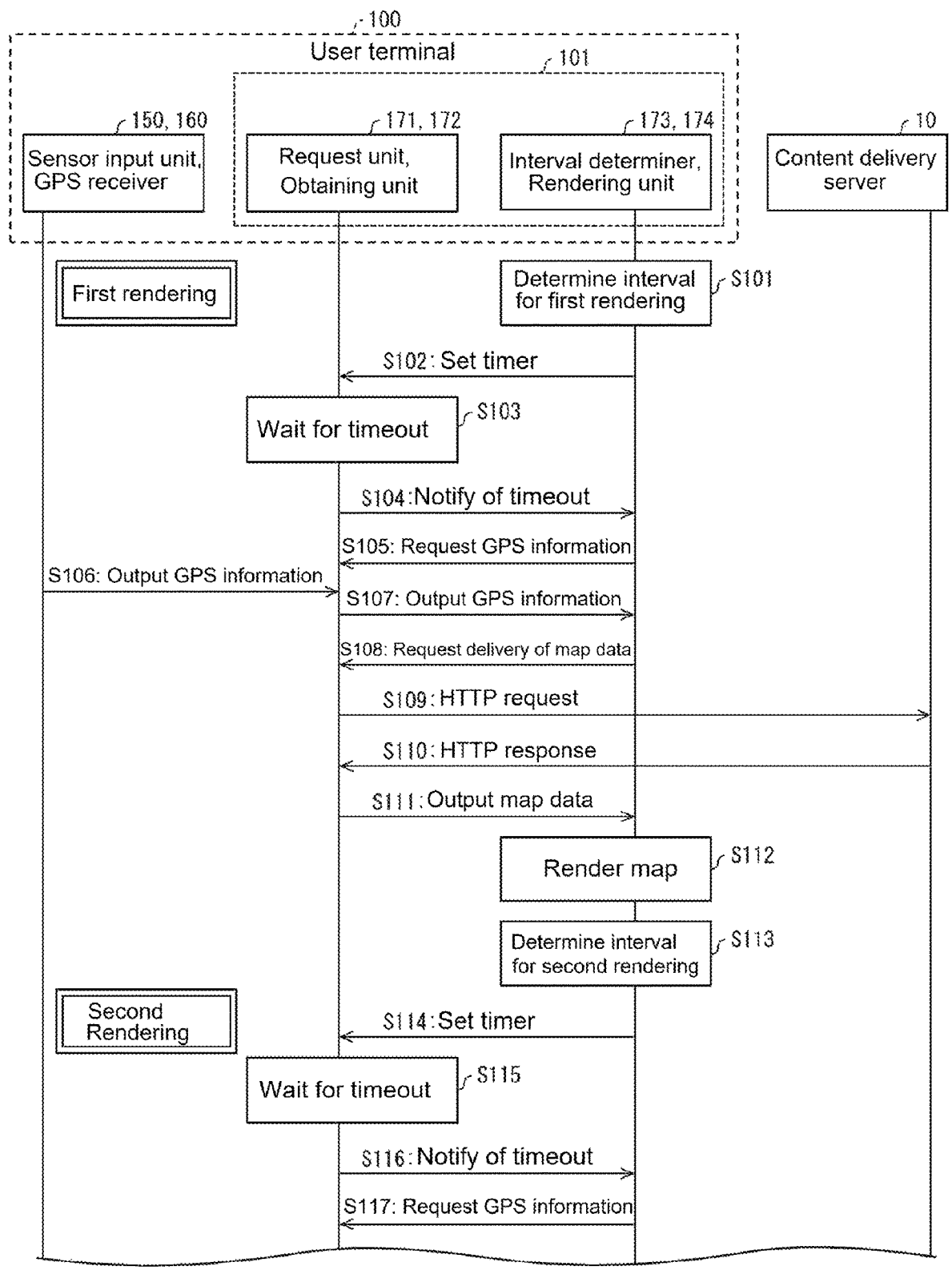
FIG. 5 is a sequence diagram showing a display process performed by the user terminal.

Referring to FIG. 5, the display process performed by the user terminal 100 will be described in more detail. FIG. 5 is a sequence diagram showing the display process performed by the user terminal 100.

First Rendering

As shown in FIG. 5, in step S101, the interval determiner 174 determines the interval for the first rendering. In step S101, when a user action on the user terminal 100 is performed through the web browser 101, the interval determiner 174 determines the interval within a predetermined time. The interval determiner 174 does not perform the processing of obtaining the speed data about the user 5 and the map scale data.

In step S102, the interval determiner 174 sets a timer to the interval determined in step S101. The timer function is, for example, provided by JavaScript (registered trademark) implemented in the web browser 101. The timer is set for the request unit 171. In step S103, the request unit 171 waits for the timer set in step S102 to time out.

In step S104, when the timer set in step S102 times out, the request unit 171 notifies the interval determiner 174 of the timeout. In step S105, when receiving the timeout notification from the request unit 171, the interval determiner 174 requests GPS information from the request unit 171. The GPS information is specifically the location data and the speed data about the user 5.

JavaScript is a programming language that runs in the web browser 101. More specifically, the interval determiner 174 adds a function responsible for the map rendering process as a callback function to the timer function provided by JavaScript. The interval determiner 174 starts the timer. When the timer times out, the callback function is called. The processing performed by the interval determiner 174 may not use JavaScript.

The GPS receiver 160 performs location measurement at predetermined time intervals. In step S106, the GPS receiver 160 outputs the GPS information, and the request unit 171 receives the output GPS information. In step S107, the request unit 171 outputs the GPS information received in step S106 to the interval determiner 174.

In step S108, the interval determiner 174 requests the request unit 171 to deliver map data. The interval determiner 174 uses the location data about the user 5 included in the received GPS information to determine the map data requested to be delivered. The map data requested to be delivered corresponds to the current location data about the user 5.

In step S109, the request unit 171 transmits an HTTP request to the content delivery server 10. The HTTP request is specifically the processing of requesting delivery of the map data requested to be delivered. The HTTP request includes the location data about the user 5. The request unit 171 thus obtains the location data about the user 5 at predetermined time intervals. The request unit 171 corresponds to a location data obtainer.

When receiving the HTTP request, the content delivery server 10 returns an HTTP response to the request unit 171 in step S110. The HTTP response is specifically the processing of retrieving map data requested to be delivered from the map data DB 121 and transmitting the retrieved map data to the request unit 171.

In step S111, the request unit 171 outputs the map data received from the content delivery server 10 to the rendering unit 173. In step S112, the rendering unit 173 renders the map data received from the request unit 171. The map appears on the output unit 130 included in the user terminal 100.

The interval determiner 174 obtains the speed data about the user 5 included in the GPS information received in step S107 and the map scale data stored in the predetermined storage in the user terminal 100. In step S113, the interval determiner 174 determines an interval based on the speed and the map scale as well as the unit time and the movement distance to achieve smooth map rendering.

Second Rendering

As shown in FIG. 5, the interval determiner 174 sets, in step S114, the timer to the interval determined in step S113. The timer is set for the request unit 171. In step S115, the request unit 171 waits for the timer set in step S114 to time out.

In step S116, when the set timer times out, the request unit 171 notifies the interval determiner 174 of the timeout. In step S117, when receiving the timeout notification from the request unit 171, the interval determiner 174 requests GPS information from the request unit 171.

After step S117, steps S106 to S113 are repeated similarly to the first rendering.

In this manner, the user terminal 100 updates the rendered map at the minimum frequency corresponding to the display area movement distance. The user terminal 100 thus allows smooth map display.

The user terminal 100 can lower the frequency of rendered map updates and thus reduce the map rendering load. Additionally, the user terminal 100 does not degrade the convenience of the user 5.

The processing for map updates is performed based on the control program according to the present embodiment. In the present embodiment, the control program includes an HTML file, a JavaScript file, and a WebAssembly module. The HTML file includes HTML data for map display. In the present embodiment, the HTML data for map display is HTML data that is included in webpage-forming HTML data and displays the map on the output unit 130. The JavaScript file is written in JavaScript (registered trademark). The WebAssembly module is obtained by compiling the source code of a program written in C or C# into a WebAssembly code. The compiling is performed using a dedicated compiler.

In the control program, the function responsible for the map rendering process is added as the callback function to the timer function provided by JavaScript. To update the map displayed on the output unit 130, the interval determiner 174 starts the timer based on the control program. When the timer times out, the callback function is called. When the callback function is called, the interval determiner 174 obtains the GPS information based on the control program. The obtaining unit 172 obtains map data from the content delivery server 10 with the GPS information as a parameter. The rendering unit 173 uses the map data to render the map based on the control program. The interval determiner 174 sets the timer again based on the control program. In this manner, the user terminal controller 170 can repeat the rendering processing regularly to render the map in accordance with the current location of the moving user 5. The processing performed by the interval determiner 174 may not use JavaScript. The processing performed by the obtaining unit 172 may not use JavaScript.

JavaScript alone is a known programming language that runs in a web browser. JavaScript is a simple scripting language and is not designed to achieve fast processing. Scripting languages are programming languages similar to human languages and converted into a machine language to execute programs. A program written in JavaScript is executed while being converted into a machine language, and runs slower than a program precompiled by a compiler. Thus, known web browsers cannot perform a large number of operations at a time and cannot achieve high performance.

In contrast, every major modern web browser 101 supports WebAssembly. WebAssembly has a newly designed binary-code format. The binary code is a machine language and thus runs faster than JavaScript.

When running in the web browser 101, the control program according to the present embodiment can call a WebAssembly function from JavaScript. The control program can also call a JavaScript function from WebAssembly. In other words, the control program can complement JavaScript processing with WebAssembly. The web browser 101 can thus perform a large number of operations to activate rich content (e.g., high-volume content).

For example, the web browser 101 parses the map data based on the WebAssembly module. In the parsing, the web browser 101 examines the map data transmitted from the content delivery server 10 to discriminate between data related to map updating and data unrelated to map updating, and extracts the data related to map updating from the map data. The data related to map updating is, for example, data for the appearance of the map. Examples of data related to map updating include data indicating the location, the shape, and the width of each road and data indicating the shape of each facility. Examples of data unrelated to map updating include data for route searching and data for route guidance. The web browser 101 generates rendering data from the extracted data based on the WebAssembly module. The rendering data includes information about the vertexes of a rectangle corresponding to a road or a building. The rendering data also includes polygonal information. The polygonal information is information about the vertexes of a polygon corresponding to a road or a building. In this manner, the web browser 101 generates the rendering data from the map data based on the WebAssembly module.

In the present embodiment, the web browser 101 uses canvas to render the map. Canvas is an HTML element for displaying two-dimensional (2D) computer graphics in the web browser 101. Canvas can display a figure on the output unit 130 using HTML data. Canvas is defined with an HTML tag. HTML data for map display includes a canvas element for rendering each of the figures forming the map. The web browser 101 uses the canvas function of rendering 2D figures to display the icon images of points of interface (POI) and landmarks on the map space formed by canvas. The web browser 101 uses Web Graphics Library (WebGL) to render figures representing roads on the map space. WebGL is a technique for the web browser 101 to display three-dimensional (3D) computer graphics. The web browser 101 renders icon images and figures representing roads when rectangle vertex information and polygon vertex information in the rendering data are passed to the canvas element as arguments. The rendering displays the map on the output unit 130.

Based on the HTML data for map display, the web browser 101 provides various types of display as a human-machine interface (HMI) through which the user operates the user terminal 100 to activate the navigation function. In the present embodiment, for example, the web browser 101 displays a button 52B-1 showing the text "Show routes" shown in FIG. 11.

During the navigation function being implemented by the user terminal 100, the web browser 101 may request a new HTML file from the content delivery server 10 and obtain the new HTML file. This allows the web browser 101 to change the webpage structure greatly during the navigation function being implemented by the user terminal 100.

In this manner, the web browser 101 updates the map based on the JavaScript file and the rendering data. The web browser 101 may perform other processing based on the WebAssembly module. The HTML data for map display may not be included in the control program. The user terminal 100 may prestore the HTML data for map display in the user terminal storage 140.

As described above, the user terminal 100 uses the control program according to the present embodiment to perform high-speed processing in the web browser 101 and allows the web browser to achieve the same functions as a car navigation system, such as route search, map update, and navigation functions.

Modifications of First Embodiment

As described above, the processing of displaying the first map 1 and the second map 2 in the present embodiment has been described as being performed in the current-location display mode. In the present embodiment, the map data obtaining process is performed at a predetermined frequency although no map updating is to be performed. However, the present embodiment is not limited to those examples.

In a modification of the present embodiment, the user terminal 100 may operate in the current-location moving mode instead of the current-location display mode. In another modification of the present embodiment, the user terminal 100 may not perform the map data obtaining process when no map update is to be performed.

In a modification of the present embodiment, the user terminal 100 in the current-location display mode determines whether the map is to be updated as described below.

Map to be updated: at least either the user 5 is moving or the user 5 is turning.

Map not to be updated: the user 5 is stationary.

In the current-location moving mode, the user terminal 100 determines whether the map is to be updated as described below.

Map to be updated: at least either the location icon 3 disappears from the screen shortly as the user 5 moves, or the user 5 is turning. The location icon 3 disappears from the screen shortly when the location icon 3 has moved to the edge of the screen. In this state, the map is to be updated to place the location icon 3 again at the central area of the screen.

Map not to be updated: at least either the user 5 is stationary or the user 5 is moving but the location icon 3 is estimated to remain displayed on the screen for a predetermined time.

When the timer times out, a user terminal 100 according to a first modification does not perform the map data obtaining process for a map determined not to be updated. The user terminal 100 performs the map data obtaining process for a map determined to be updated.

The user terminal 100 according to the first modification can regulate the frequency of the map data obtaining process.

A user terminal 100 according to a second modification displays the location icon 3 corresponding to the location data about a third party different from the user 5. The third party is located at, for example, a place remote from the user 5. The distance may be any length. The third party is a movable object. The movable object is, for example, a human or a vehicle. The user terminal 100 according to the second modification obtains the location data about the third party from a device other than the user terminal 100. For example, the user terminal 100 obtains the location data about the third party from the content delivery server 10. In this case, the third party transmits the location data about the third party to the content delivery server 10 as appropriate. The location data about the third party may be obtained from a server different from the content delivery server 10.

The user terminal 100 according to the second modification allows the user terminal 100 of the user 5 to track the location of the third party remote from the user terminal 100. More specifically, the user terminal 100 according to the second modification can navigate the remote third party to a destination. In other cases, the user terminal 100 according to the second modification can monitor the movement of the third party remote from the user 5.

The above first and second modifications are applicable in any one of the current-location display mode and the current-location moving mode of the display processing. The second modification allows the map data obtaining process to be performed at a predetermined frequency irrespective of whether the map is to be updated. In the second modification, the map data obtaining process may be stopped for a map not to be updated, whereas the map data obtaining process may be performed for a map to be updated.

Second Embodiment

An example display process performed by a display device according to a second embodiment of the present invention will be described with reference to FIG. 6.

Figure 6:
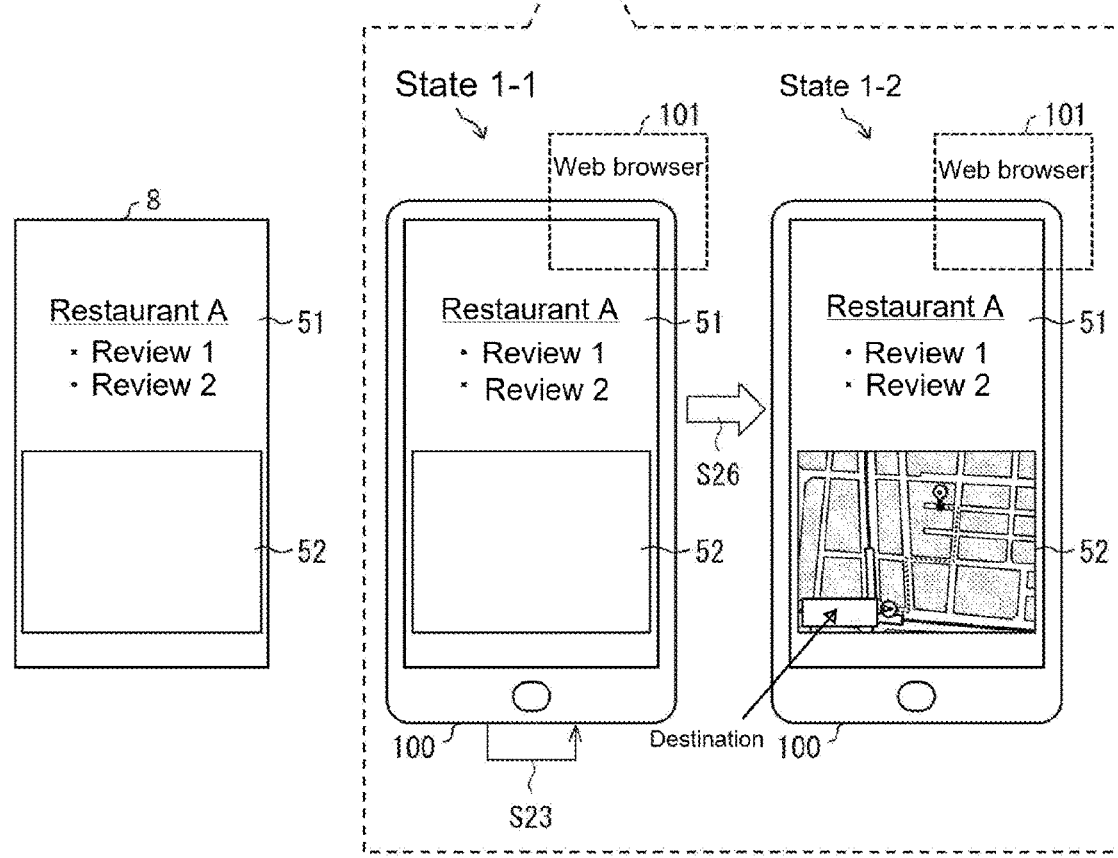
FIG. 6 is a diagram showing an example display process performed by a user terminal according to a second embodiment.

A web server 20 shown in FIG. 6 delivers a webpage to a user terminal 100. The webpage delivered by the web server 20 is formed with, for example, an HTML file or an Extensible Markup Language (XML) file. The HTML file is written in HTML. The XML file is written in XML. In the example of FIG. 6, the web server 20 delivers a webpage 8 that is an example webpage to the user terminal 100.

The webpage 8 specifies, with a tag, that pieces of content in the page are obtained from another server. In the present embodiment, the other server is the content delivery server 10. For example, the user terminal 100 obtains the webpage 8 and then requests the content delivery server 10 to deliver the map data as the content in accordance with the specification with the tag for obtaining the content. The content delivery server 10 then delivers the map data to the user terminal 100. The request to deliver the map data is provided by a web browser 101 executing an inline frame (iframe) tag embedded in the webpage 8. The map is nested within the HTML file forming the webpage 8.

1. Display Process

The state transition of the user terminal 100 is illustrated in FIG. 6 as state 1-1 and state 1-2 in this order from the left.

Figure 7:
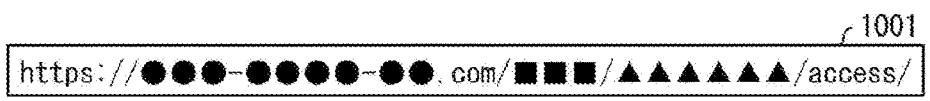
FIG. 7 is a diagram showing an example Uniform Resource Locator (URL).

As shown in FIG. 6, the user terminal 100 first accesses the source Uniform Resource Locator (URL) for the webpage 8 that the user 5 intends to view in step S21. The source URL is, for example, the URL denoted by 1001 in FIG. 7. More specifically, the user terminal 100 accesses the web server 20 that provides the webpage 8. When accessed by the user terminal 100, the web server 20 delivers the webpage 8 in step S22.

In the example of FIG. 6, the webpage 8 is, for example, content of an access guide to a shop such as a store or a commercial facility aiming to draw customers. Although not shown in the example of FIG. 6, the webpage 8 may be longer in a vertical direction than the display area of the user terminal 100. In this case, a portion of the webpage 8 within the display area of the user terminal 100 is displayed on the display area, whereas a portion of the webpage 8 outside the display area is not displayed. The user of the user terminal 100 scrolls the displayed webpage 8 with, for example, a finger swipe or flick gesture to change the portion of the webpage 8 placed within the display area.

Figure 8:
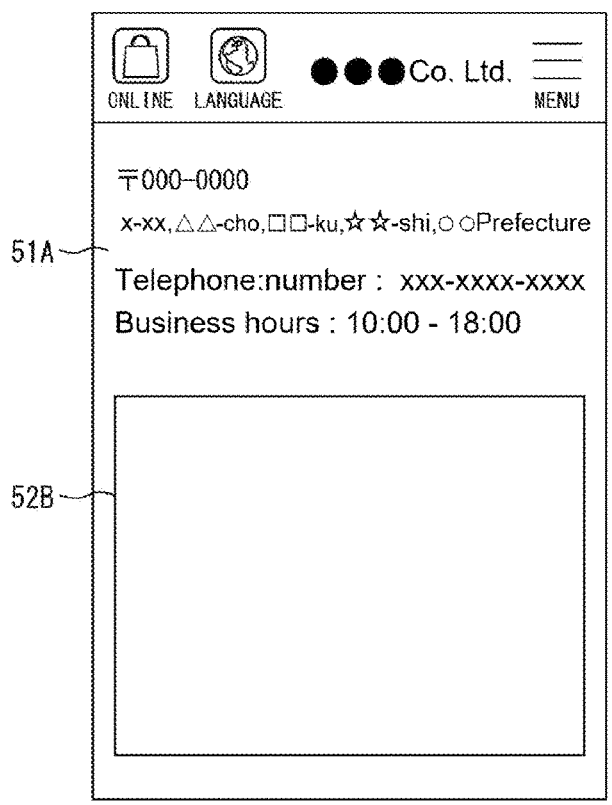
FIG. 8 is a diagram showing a specific example of a webpage with a display space and a map space.

In state 1-1, the webpage 8 includes a display space 51 that displays information about a store or a commercial facility such as its address, contact information, and topics, and also includes a map space 52 that displays a map delivered independently of the webpage 8. The map space 52 is positioned, for example, in the lower part of the webpage 8. The map space 52 is a portion that displays a map delivered independently of the webpage 8. FIG. 8 shows a specific example of the display space 51 and the map space 52. As shown in FIG. 8, a display space 51A displays an address, a telephone number, and business hours. A map space 52B shows no map.

Figure 9:
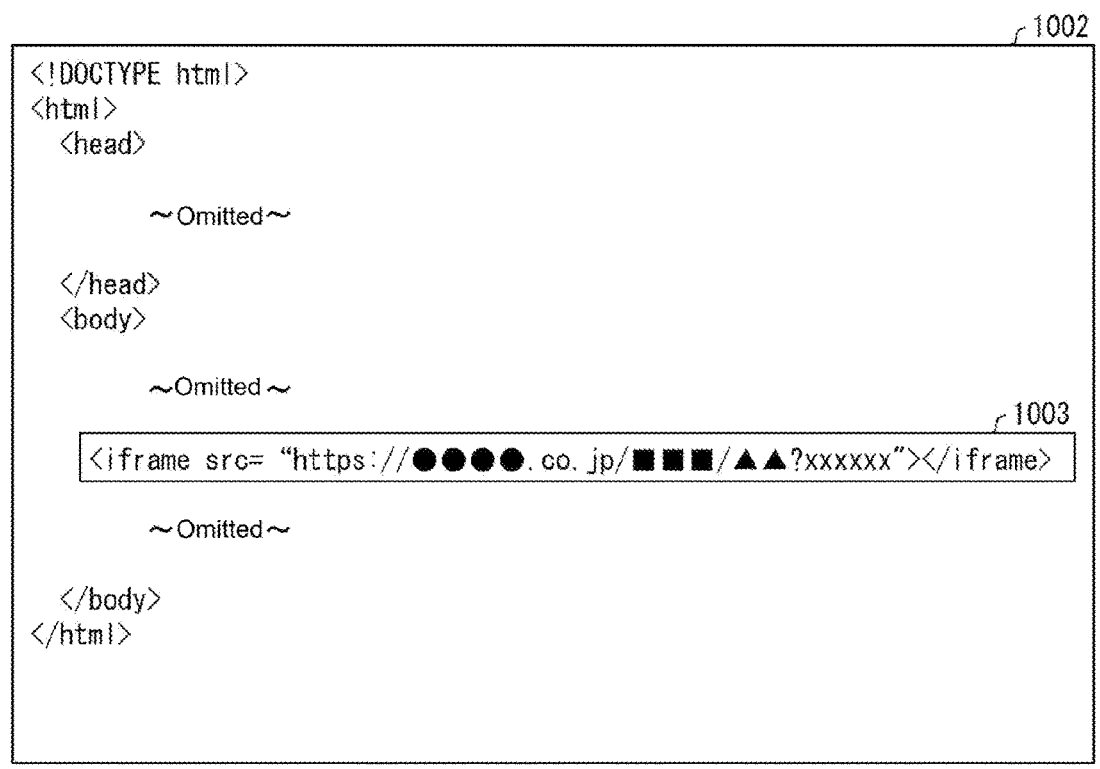
FIG. 9 is a diagram showing an example Hypertext Markup Language (HTML) file containing an iframe tag.
Figures 10, 11:
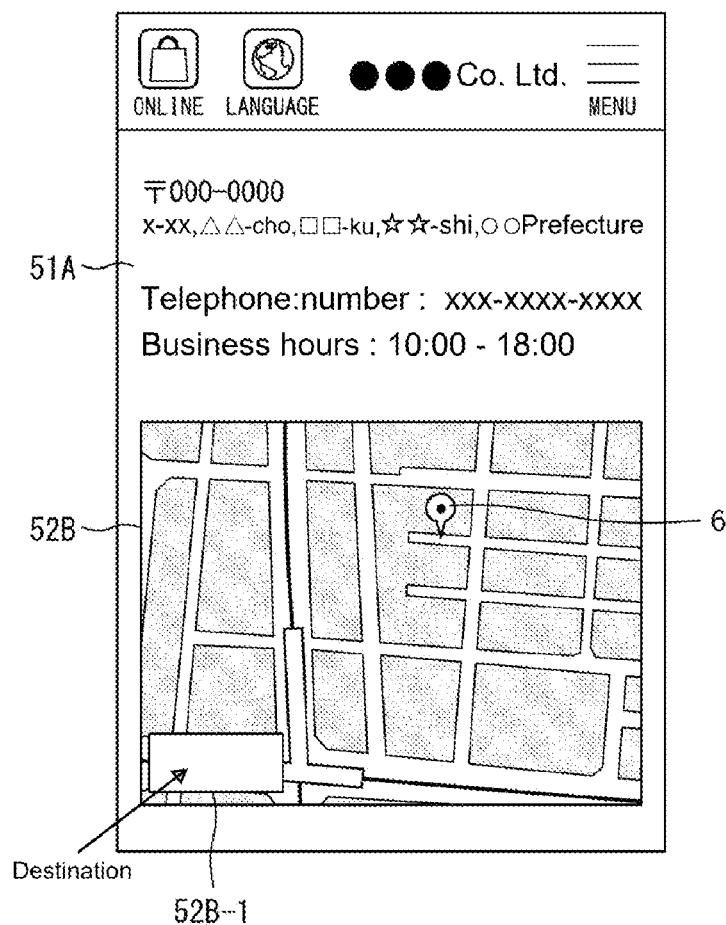
FIG. 10 is a diagram showing an example URL.
FIG. 11 is a diagram showing a specific example of a webpage with a display space and a map space.

In the HTML file forming the webpage 8, the iframe tag is embedded to request the delivery of the map data for the map to be displayed on the map space 52. The HTML file forming the webpage 8 is, for example, the HTML file denoted by 1002 in FIG. 9. The iframe tag embedded in the HTML file is, for example, the iframe tag denoted by 1003 in FIG. 9. In step S23, the user terminal 100 requests the delivery of the map data based on the iframe tag for the webpage 8. More specifically, the user terminal 100 accesses the URL written in the HTML file to obtain the map data. The URL accessed is, for example, the URL denoted by 1004 in FIG. 10. The URL denoted by 1004 in FIG. 10 is the URL included in the iframe tag denoted by 1003 in FIG. 9.

In the present embodiment, the user terminal 100 obtains the map data from the content delivery server 10.

In step S24, the user terminal 100 requests the content delivery server 10 to deliver the map data. In response to the request to deliver the map data, the content delivery server 10 delivers the map data to the user terminal 100 in step S25.

In the present embodiment as well, the user terminal 100 performs the processing of obtaining the map data from the content delivery server 10 in the same manner as in the first embodiment. More specifically, in the present embodiment, the map data obtaining process may or may not be performed for a map not to be updated.

The user terminal 100 obtains the map data through the above processing. In step S26, the user terminal 100 displays the map on the map space 52 based on the delivered map data. The processing in step S26 shifts the user terminal 100 to state 1-2. FIG. 11 shows a specific example of the display space 51 and the map space 52. As shown in FIG. 11, the display space 51A displays an address, a telephone number, and business hours. The map space 52B displays a map.

Figure 12:
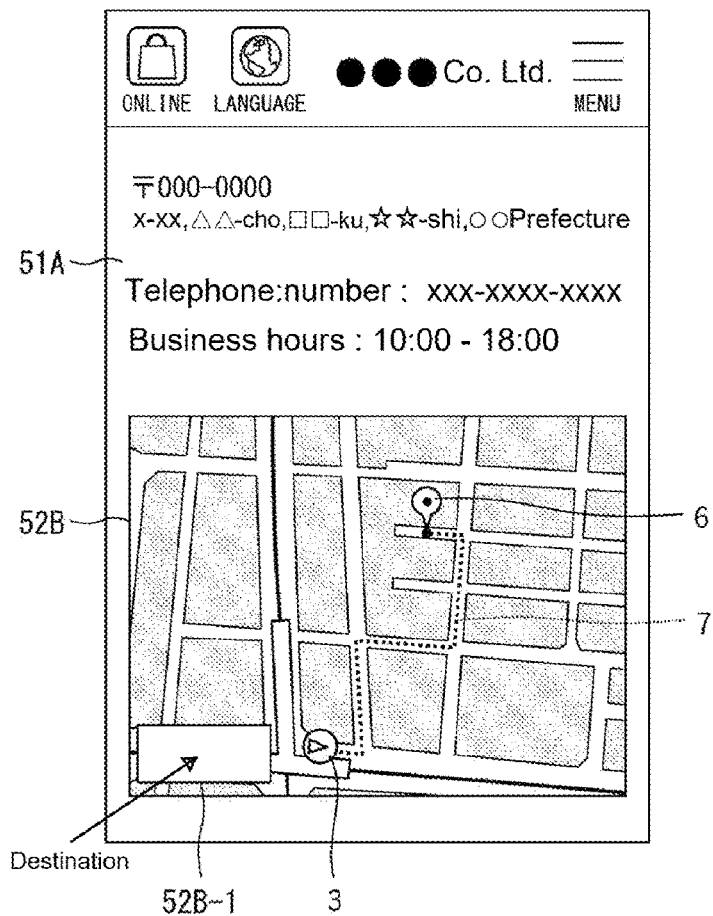
FIG. 12 is a diagram showing a specific example of a webpage with a display space and a map space.

In the example of FIG. 11, the map space 52B displays a map indicating a destination. The destination is, for example, the location of a shop. More specifically, the map displays a location icon 6 indicating the destination. The map space 52B also displays the button 52B-1 showing the text "Show routes." When the user 5 clicks the position of the button 52B-1, the location icon 3 and a route indication 7 appear as shown in FIG. 12. The location icon 3 is displayed at the current location of the user 5. The route indication 7 indicates a path from the current location of the user 5 to the destination. After the position of the button 52B-1 is clicked, the map scale varies depending on the distance between the current location of the user 5 and the destination. The map scale increases as the distance between the current location of the user 5 and the destination increases.

When the user 5 uses the user terminal 100 as a navigator, the user terminal 100 displays a map of a predetermined area including the current location of the user 5. The predetermined area varies with the map scale. The predetermined area widens as the map scale increases. The predetermined area narrows as the map scale decreases. The predetermined area varies with the movement of the user 5.

2. System Configuration

Figure 13:
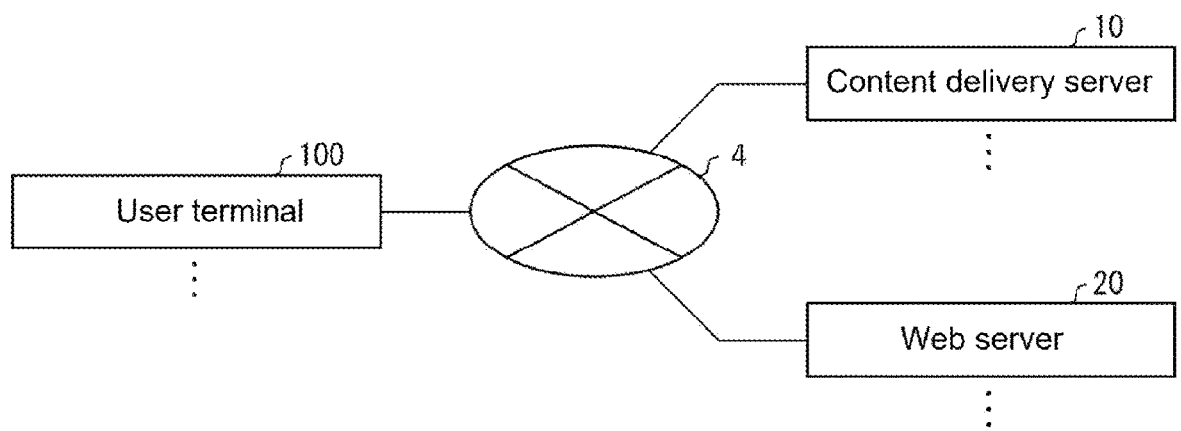
FIG. 13 is a diagram of a system in the second embodiment showing an example configuration.

Referring to FIG. 13, the system configuration in the present embodiment will be described. FIG. 13 is a diagram of a system in the present embodiment showing an example configuration. As shown in FIG. 13, the system in the present embodiment includes the user terminal 100, the content delivery server 10, and the web server 20. The user terminal 100, the content delivery server 10, and the web server 20 are connected together through a network 4 to allow wired or wireless communication. The system shown in FIG. 13 may include any number of devices. For example, the system in the present embodiment may include multiple user terminals 100. For example, the system in the present embodiment may include multiple content delivery servers 10. For example, the system in the present embodiment may include multiple web servers 20.

3. Web Server Configuration

Figure 14:
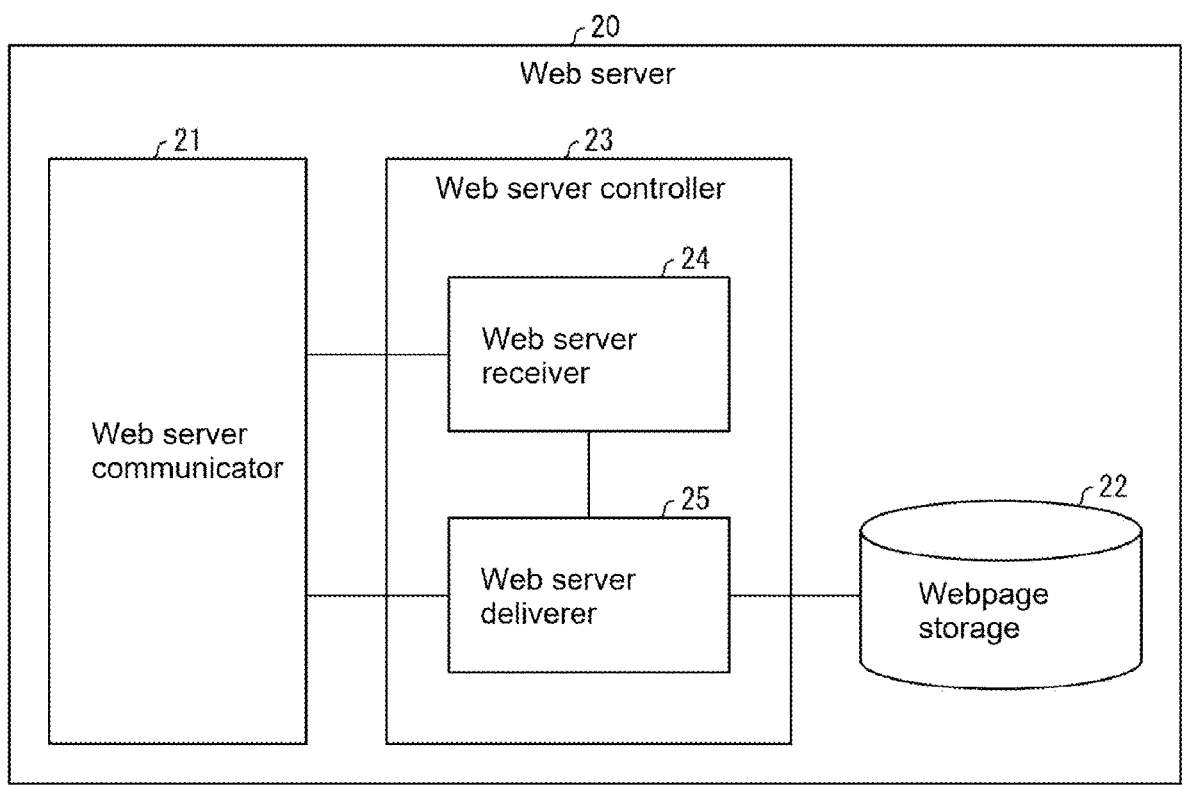
FIG. 14 is a diagram of a web server in the second embodiment showing an example configuration.

Referring to FIG. 14, the configuration of the web server 20 will be described. FIG. 14 is a diagram of the web server 20 showing an example configuration. As shown in FIG. 14, the web server 20 includes a web server communicator 21, a webpage storage 22, and a web server controller 23. The web server 20 corresponds to a second server.

The web server communicator 21 is implemented by, for example, an NIC. The web server communicator 21 is connected to the network 4 in a wired or wireless manner and transmits and receives information to and from the user terminal 100 and the content delivery server 10.

The webpage storage 22 is implemented by a storage device. Examples of the storage device include a hard disk drive, an optical disc, or a semiconductor memory device such as a RAM or a flash memory. The webpage storage 22 stores, for example, an HTML file or image data. The HTML file is written in HTML to form the webpage 8. The image data is still image data or moving image data included in the webpage 8.

The web server controller 23 is implemented by, for example, a CPU or an MPU. The CPU or the MPU executes various programs stored in the storage device inside the web server 20 using the RAM as a work area. The web server controller 23 is implemented by, for example, an integrated circuit such as an ASIC or an FPGA.

As shown in FIG. 14, the web server controller 23 includes a web server receiver 24 and a web server deliverer 25, and implements or produces the function and the effect of information processing described later. The internal configuration of the web server controller 23 may not be the configuration shown in FIG. 14 but may be any other configuration that allows the information processing described later. The processing units of the web server controller 23 may be connected in a manner other than shown in FIG. 14.

The web server receiver 24 receives a delivery request for the webpage 8 from the user terminal 100. For example, the web server receiver 24 receives an HTTP request as a request for the webpage 8.

When the web server receiver 24 receives a delivery request for the webpage 8, the web server deliverer 25 delivers the webpage 8 to the user terminal 100. More specifically, the web server deliverer 25 obtains the webpage 8 to be delivered from the webpage storage 22, and delivers the obtained webpage 8 to the user terminal 100. When displaying the obtained webpage 8, the user terminal 100 requests the content delivery server 10 to deliver map data. The map data delivered to the user terminal 100 is map data for the map to be displayed on the map space 52. The user terminal 100 performs the processing of obtaining map data for the map to be displayed on the map space 52.

4. Example Use of User Terminal

The user terminal 100 can provide directions to a destination in the webpage. Thus, for a company that uses the user terminal 100 as a navigation system, the system provides a seamless guide to a shop and assists in drawing customers.

The control program according to the present embodiment is usable on every mobile terminal with a web browser. This eliminates the use of a dedicated application and a special system and allows companies to more easily introduce the control program according to the present embodiment as a navigation system.

Additionally, a customer using the user terminal 100 can go to a shop found in a website without setting the destination in a dedicated application.

The present embodiment may be applicable to a business model targeted at companies that have webpages supporting the control program according to the present embodiment. The model may charge the companies based on the number and types of requests transmitted from the user terminal 100 to the content delivery server 10.

The control program according to the present embodiment may not be a program executable in a web browser but may be executed in an application.

Hardware Configuration

The hardware configuration of the system in the first and second embodiments will be described.

Figure 15:
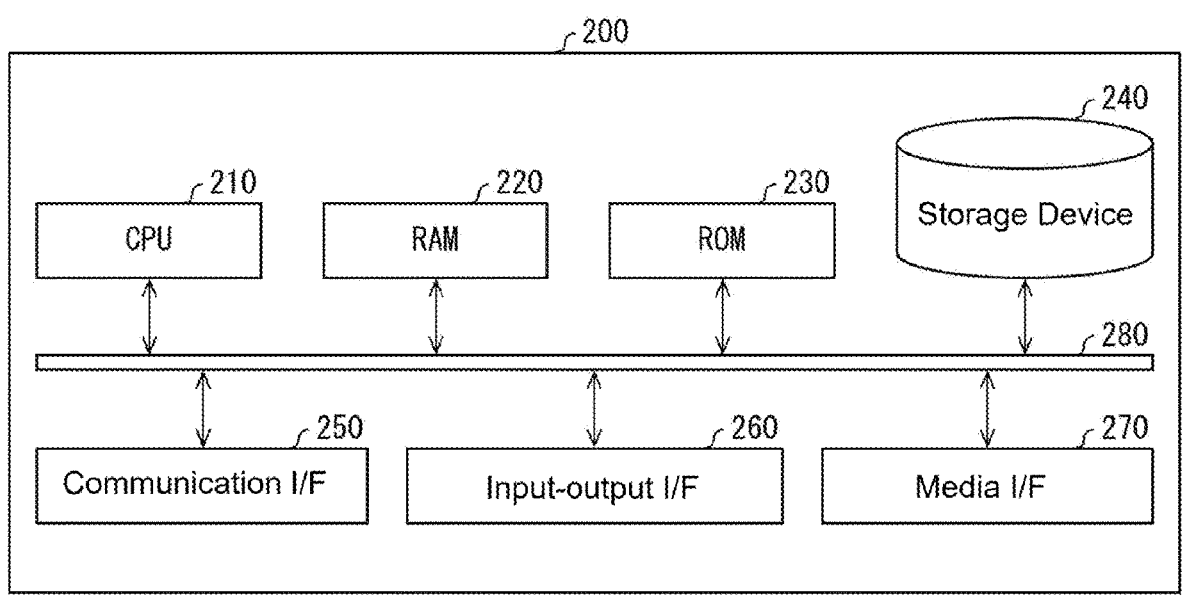
FIG. 15 is a hardware block diagram of an example computer that implements the functions of the user terminal.

The user terminal 100, the content delivery server 10, and the web server 20 are implemented by, for example, a computer 200 having a configuration shown in FIG. 15. The configuration will now be described for the user terminal 100.

FIG. 15 is a hardware block diagram of an example of the computer 200 that implements the functions of the user terminal 100. The computer 200 includes a CPU 210, a RAM 220, a read-only memory (ROM) 230, a storage device 240 such as an HDD, a communication interface (I/F) 250, an input-output I/F 260, and a media I/F 270. These components transmit and receive information to and from each other with a bus 280.

The CPU 210 operates based on programs stored in the ROM 230 or the storage device 240 and controls each component. The ROM 230 stores a boot program executable by the CPU 210 to boot the computer 200 and other programs dependent on the hardware of the computer 200.

The storage device 240 stores programs executable by the CPU 210 and data usable by the programs. The communication I/F 250 receives, for example, data from another device through the network 4 shown in FIG. 2 and transmits the data to the CPU 210. The communication I/F 250 also transmits data generated by the CPU 210 to another device through the network 4.

The CPU 210 controls output devices such as a display and a printer and input devices such as a keyboard and a mouse through the input-output I/F 260. The CPU 210 obtains data from an input device through the input-output I/F 260. The CPU 210 also outputs generated data to an output device through the input-output I/F 260.

The media I/F 270 reads a program or data stored in a recording medium (not shown) and provides the program or the data to the CPU 210 through the RAM 220. The CPU 210 loads the program from the recording medium into the RAM 220 through the media I/F 270 and executes the loaded program. The recording medium is, for example, an optical recording medium such as a digital versatile disc (DVD), a magneto-optical recording medium such as a magneto-optical (MO) disk, a tape medium, a magnetic recording medium, or a semiconductor memory.

For example, for the computer 200 serving as the user terminal 100, the CPU 210 in the computer 200 executes programs loaded in the RAM 220 to implement the functions of the user terminal controller 170. The CPU 210 in the computer 200 obtains the programs from another device through the network 4. In other examples, the CPU 210 may read the programs from the recording medium.

Third Embodiment

In the first and second embodiments described above, the user 5 is an example of the movable object in the first and second embodiments. In the present embodiment described below, a vehicle is an example of the movable object in the present embodiment.

In the present embodiment, the user terminal 100 is installed in a vehicle. The user terminal 100 uses SmartDeviceLink (SDL) to cooperate with a navigator installed in the vehicle. The cooperation allows transmission and reception of information to and from the navigator through near field communication. This allows the user terminal 100 to obtain vehicle location data and vehicle speed data from the navigator.

In the present embodiment, the user terminal 100 may not include the GPS receiver 160, reducing the cost of producing the user terminal 100.

Third Modification

Figure 16:
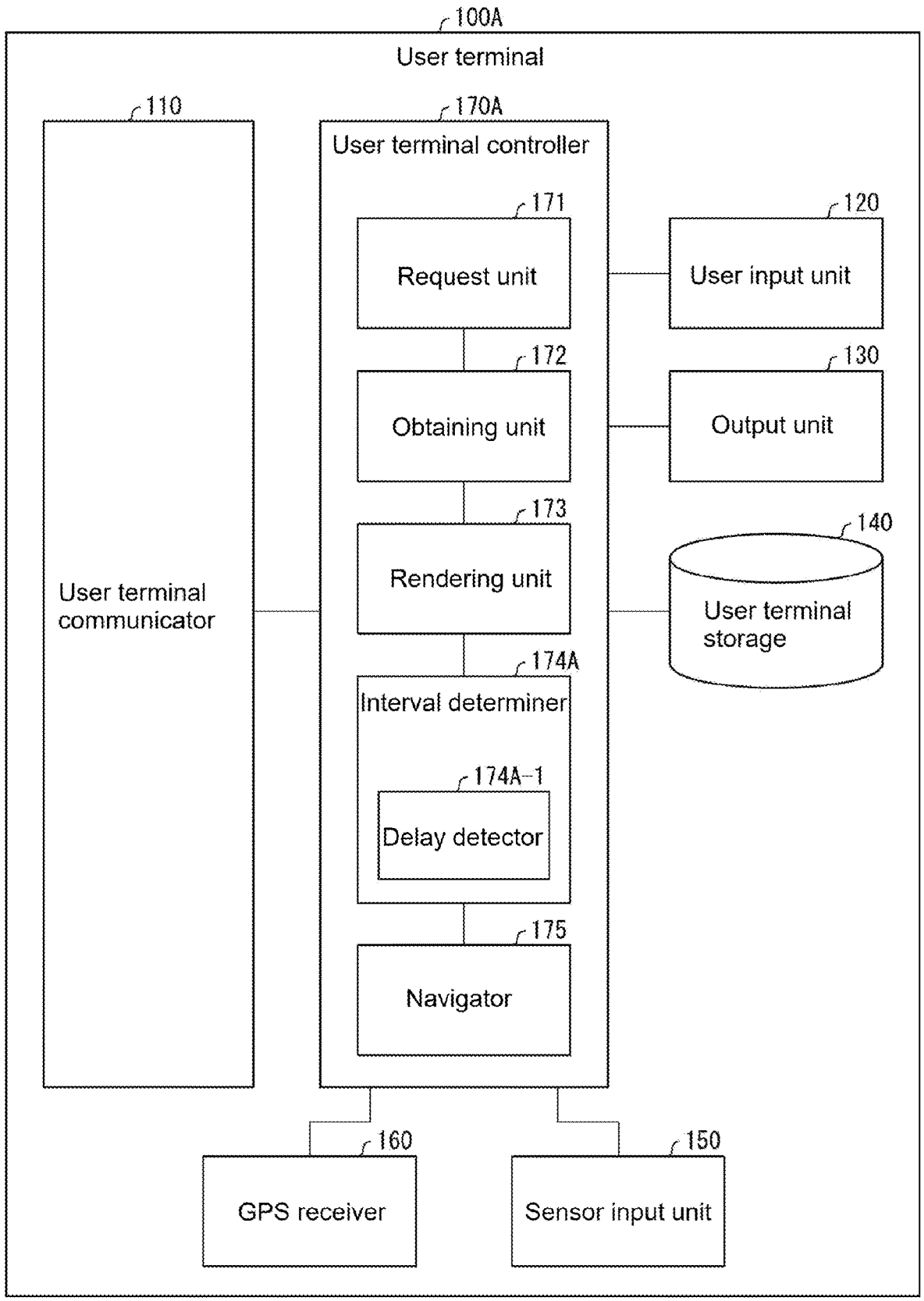
FIG. 16 is a diagram of a user terminal according to a third modification showing an example configuration.

A third modification of the first, second, and third embodiments will be described. FIG. 16 is a diagram of a user terminal 100A according to the third modification showing an example configuration. The user terminal 100A according to the third modification differs from the user terminal 100 according to the first, second, and third embodiments in including an interval determiner 174A with a delay detector 174A-1 in place of the interval determiner 174.

The user terminal 100 according to the above first, second, and third embodiments communicates with the content delivery server 10 through the network 4 in FIG. 2. The network 4 is, for example, the Internet. Thus, the speed of communication between the user terminal 100 and the content delivery server 10 is determined by the communication quality of the network 4, and a communication delay may occur.

The user terminal 100 according to the third modification determines the interval based on the communication time between the user terminal 100 and the content delivery server 10. The communication time is the time taken for the user terminal 100 to obtain map data from the content delivery server 10. This approach allows the user terminal 100 according to the third modification to determine an interval that is less susceptible to a communication delay.

More specifically, the interval determiner 174A determines the interval based on Formula 3:

Interval=Movement distance to achieve smooth map rendering/Display area movement distance−Communication time  (3).

The communication time in Formula 3 is obtained by the delay detector 174A-1. In detail, the delay detector 174A-1 determines the difference between the time stamp of the request unit 171 transmitting an HTTP request to the content delivery server 10 and the time stamp of the request unit 171 receiving an HTTP response from the content delivery server 10. The difference is the communication time in Formula 3.

Fourth Modification

Figure 17:
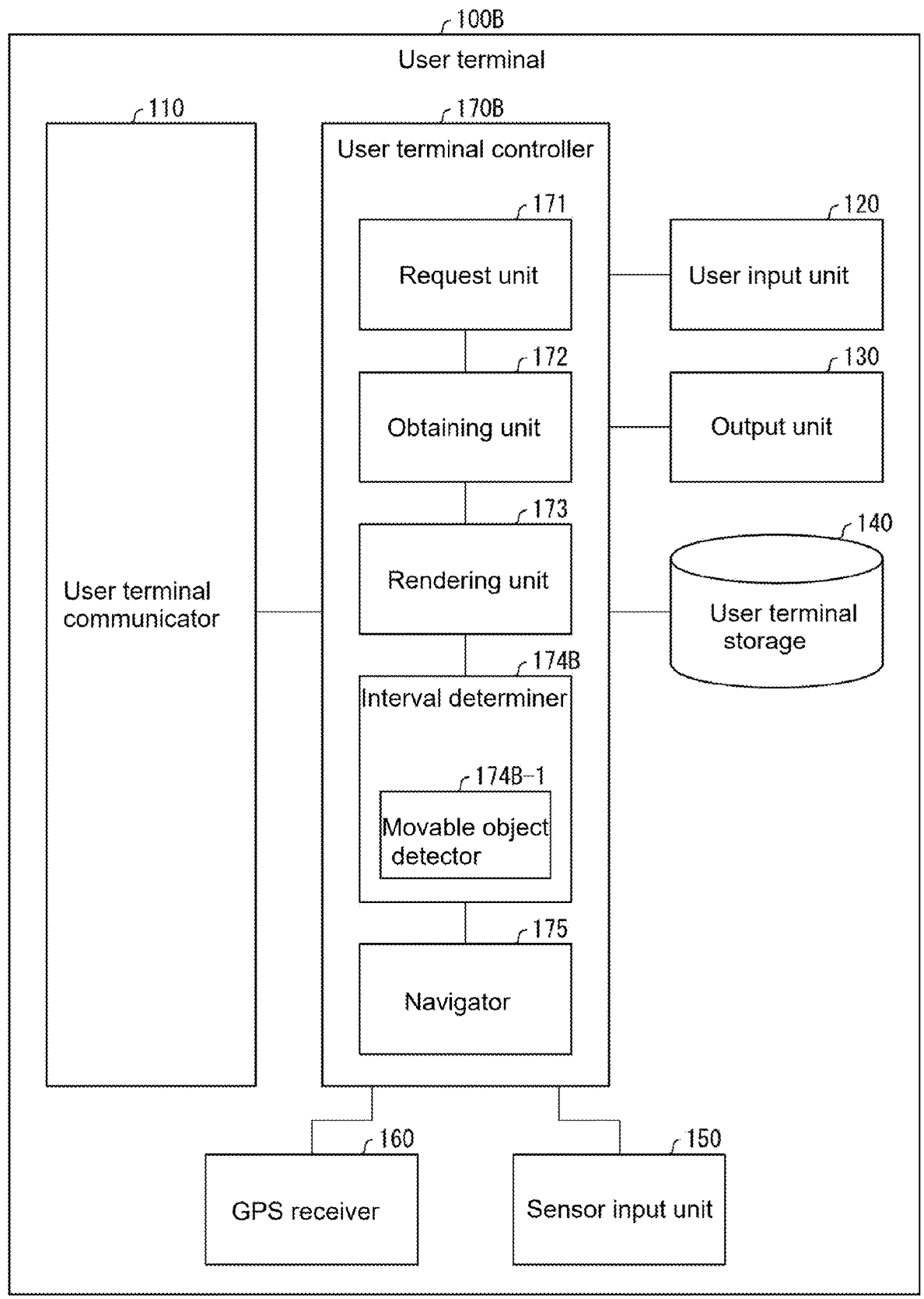
FIG. 17 is a diagram of a user terminal according to a fourth modification showing an example configuration.

A fourth modification of the first, second, and third embodiments will be described. FIG. 17 is a diagram of a user terminal 100B according to the fourth modification showing an example configuration. The user terminal 100B according to the fourth modification differs from the user terminal 100 according to the first, second, and third embodiments in including an interval determiner 174B with a movable object detector 174B-1 in place of the interval determiner 174.

The interval determiner 174B determines the interval based on the type of the movable object in place of the display area movement distance per unit time.

More specifically, when the movable object detector 174B-1 determines the movable object as a human, the interval determiner 174B estimates that the movement of the movable object causes a relatively slight change in the map per unit time. In this case, the interval determiner 174B sets a relatively long interval.

In contrast, when the movable object detector 174B-1 determines the movable object as a vehicle, the interval determiner 174B estimates that the movement of the movable object causes a relatively great change in the map per unit time. In this case, the interval determiner 174B sets a relatively short interval.

The interval determiner 174B may determine the interval also based on the scale of the map.

Fifth Modification

Figure 18:
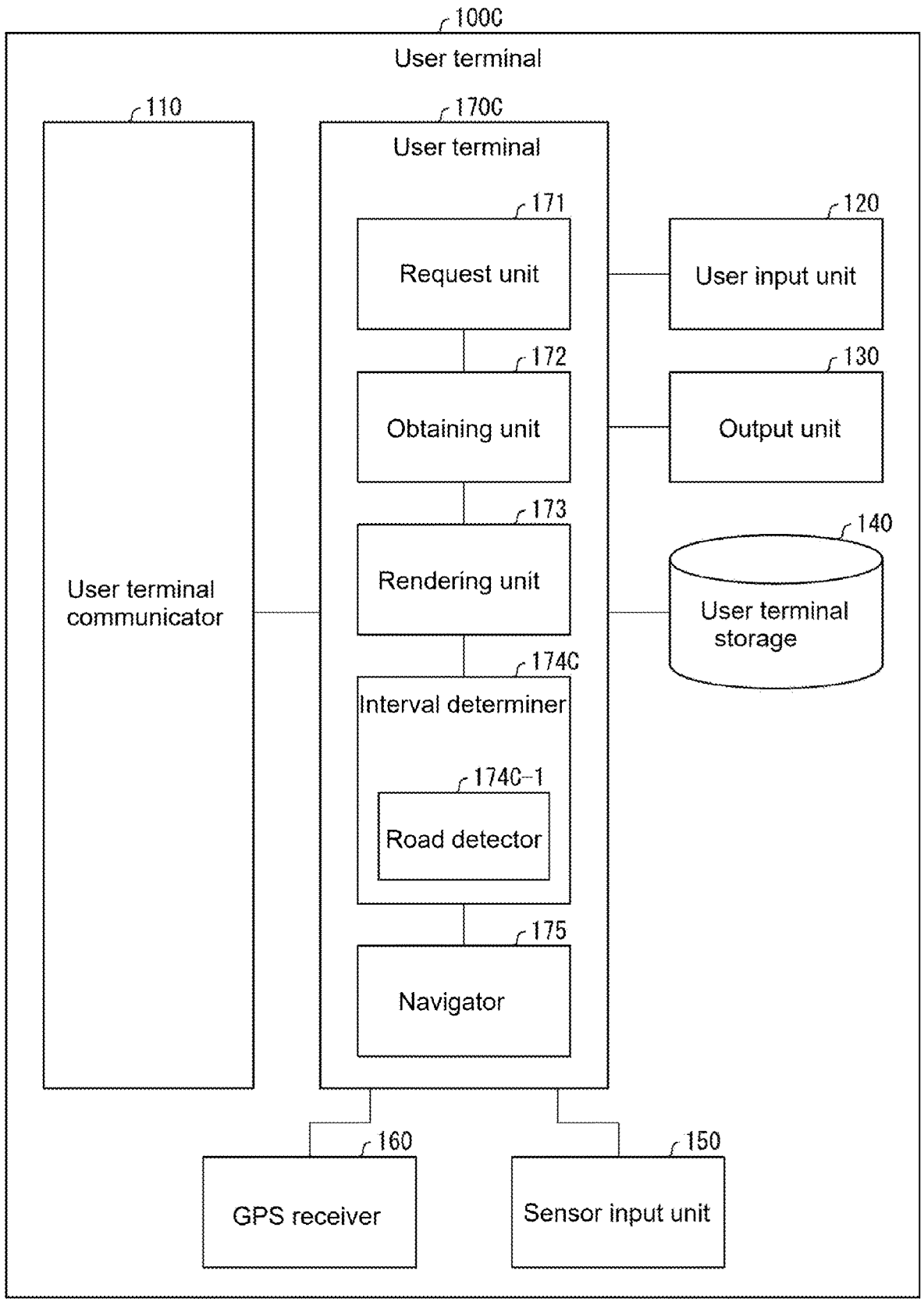
FIG. 18 is a diagram of a user terminal according to a fifth modification showing an example configuration.

A fifth modification of the first, second, and third embodiments will be described. FIG. 18 is a diagram of a user terminal 100C according to the fifth modification showing an example configuration. The user terminal 100C according to the fifth modification differs from the user terminal 100 according to the first, second, and third embodiments in including an interval determiner 174C with a road detector 174C-1 in place of the interval determiner 174.

When the movable object is a vehicle, the interval determiner 174C obtains the type of the road being traveled by the vehicle from the map data. The interval determiner 174C determines the interval based on the obtained road type.

More specifically, when the road detector 174C-1 determines the road type as an expressway, the interval determiner 174C estimates that the movement of the movable object causes a relatively great change in the map per unit time. In this case, the interval determiner 174C sets a relatively short interval.

In contrast, when the road detector 174C-1 determines the road type as a backstreet, the interval determiner 174C estimates that the movement of the movable object causes a relatively slight change in the map per unit time. In this case, the interval determiner 174C sets a relatively long interval.

The interval determiner 174C may determine the interval also based on the scale of the map.

Sixth Modification

In a user terminal 100 according to a sixth modification, the map displayed on the screen is updated in accordance with a load that is a degree of processing performed by the CPU in the user terminal 100. For a relatively light CPU load, the user terminal 100 updates the map on the screen at a relatively high frequency. For a relatively heavy CPU load, the user terminal 100 updates the map on the screen at a relatively low frequency.

More specifically, for a CPU load decreasing below the previously sensed load, the user terminal 100 increases the frequency of updating the map on the screen to a value higher than the previously set update frequency. This allows the user location icon or the figures representing buildings on the screen to move by a smaller distance per update, allowing the map to be rendered smoothly on the screen. The user terminal 100 can thus use the device performance to improve the image quality of the map. When the CPU load is increased by, for example, the start of another function, the user terminal 100 reduces the frequency of updating the map on the screen to a value lower than the previously set update frequency, allowing the function to work without interference. Thus, the user terminal 100 can maintain convenience and achieve the improved image quality of the map.

To determine the interval, the interval determiner 174 obtains CPU utilization. The CPU utilization represents a load on the CPU. The CPU utilization is a value indicating the percentage of the capacity being used for processing to the total capacity usable by the user terminal controller 170 at a time. The interval determiner 174 may obtain other values different from the CPU utilization and indicating the load on the user terminal controller 170. Examples of the other values indicating the load on the user terminal controller 170 include resource utilization and memory utilization.

The interval determiner 174 determines the interval based on the CPU utilization. The interval is set to achieve acceptable smooth map rendering. In addition, in response to the load on the CPU in the user terminal 100 decreasing below the previously sensed load, the interval is set as a value shorter than the previously set interval. In response to the load on the CPU in the user terminal 100 exceeding the previously sensed load, the interval is set as a value longer than the previously set interval.

The interval determiner 174 may determine, for example, the interval as 30 msec or more and less than 100 msec for less than 30% CPU utilization, determine the interval as 100 msec or more and less than 200 msec for 30% or more and less than 50% CPU utilization, and determine the interval as 200 msec or more and less than 400 msec for 50% or more CPU utilization.

The obtaining unit 172 obtains map data at determined intervals to receive the map data at a frequency corresponding to the load on the CPU in the user terminal 100.

As described above, for a relatively light CPU load, the user terminal controller 170 can increase the frequency of map updates to allow the user location icon or the figures representing buildings on the screen to move by a smaller distance per update, allowing the map to be rendered more smoothly on the screen. The user terminal 100 according to the sixth modification can thus use the device performance to improve the image quality of the map displayed on the screen.

In the user terminal 100 according to the sixth modification, the interval determiner 174 may determine the interval based on speed data and scale data and adjust the determined interval based on the CPU utilization.

For example, the interval determiner 174 maintains the determined interval unchanged when the CPU utilization is 50% or more, shortens the determined interval by 5% or more and less than 20% when the CPU utilization is 30% or more and less than 50%, and shortens the determined interval by 20% or more and less than 30% when the CPU utilization is less than 30%.

This approach allows the user terminal 100 according to the sixth modification to update the rendered map at the minimum frequency corresponding to the display area movement distance and also improve the image quality of the map on the screen in accordance with the load on the CPU in the user terminal 100.

Other Embodiments

In the first, second, and third embodiments, although the interval is determined by the user terminal 100, the user may determine and manually set the interval to a value.

In the first, second, and third embodiments, although the user terminal 100 has the GPS capability, the user terminal 100 may not have the GPS capability. The user terminal 100 may obtain location data from an external GPS.

Implementation Using Software

The control blocks (in particular, the user terminal controllers 170, 170A, 170B, and 170C) in the user terminals 100, 100A, 100B, and 100C may be implemented by a logic circuit (hardware), such as an integrated circuit (IC) chip, or by software.

For implementation by software, the user terminals 100, 100A, 100B, and 100C each include a computer that executes instructions from programs being the software to achieve the functions. The computer includes, for example, one or more processors and a computer-readable storage medium storing the programs. In the computer, the processors read the programs from the storage medium and executes them to achieve one or more aspects of the present invention. Examples of the processors include a CPU. The storage medium may be a non-transitory tangible medium, such as a ROM, a tape, a disk, a card, a semiconductor memory, or a programmable logic circuit. The storage medium may also include a RAM into which the programs are loaded. The programs may be provided through any transmission medium (such as a communication network or a broadcast wave) that can transmit the programs to the computer. One or more aspects of the present invention may also be implemented with the programs electronically transmitted in the form of data signals carried by carrier waves.

The embodiments disclosed herein should not be construed to be restrictive, but may be modified within the spirit and scope of the claimed invention. The technical features described in the embodiments may be combined in other embodiments within the technical scope of the invention.

A display device according to one aspect of the present disclosure includes a display, a communication obtainer, a location data obtainer, and a display controller. The display displays a map. The map is displayed based on map data and HTML data. The communication obtainer obtains the map data and the HTML data. The map data and the HTML data are obtained through HTTP communication. The location data obtainer obtains location data. The location data is obtained at predetermined time intervals. The display controller updates the map. The map is the map displayed on the display. The map data obtained by the communication obtainer is map data corresponding to the location data. The map data is obtained at a predetermined frequency. The predetermined frequency is a frequency corresponding to the distance between a position indicated by location data and a position indicated by other location data that is obtained subsequently. The map is updated based on the map data. The map data is obtained by the communication obtainer.

In the display device according to one aspect of the present disclosure, the communication obtainer obtains a program. The program causes the map to be updated. The map is the map displayed by the display.

In the display device according to one aspect of the present disclosure, the display controller updates the map based on the speed of a movable object, the map scale, and an obtaining time. The speed of the movable object is determined from the location data. The obtaining time is the time taken for the communication obtainer to obtain the map data.

In the display device according to one aspect of the present disclosure, the map is displayed by a web browser.

In the display device according to one aspect of the present disclosure, the communication obtainer communicates with each of a first server and a second server. The second server is a server different from the first server. The communication obtainer obtains the map data and the program. The map data and the program are obtained from the first server. The communication obtainer obtains the HTML data. The HTML data is obtained from the second server. In the HTML data, the structure of a page is written. The page includes the map as an element.

In the display device according to one aspect of the present disclosure, the map is displayed through an application.

A control program according to one aspect of the present disclosure includes a JavaScript (registered trademark) file and a module. The JavaScript file is written in JavaScript. The module is a WebAssembly module. The program causes a display device to function as a location data obtainer and a display controller. The display device includes a display and a communication obtainer. The display displays a map. The map is displayed based on map data and HTML data. The communication obtainer obtains the map data and the HTML data. The map data and the HTML data are obtained through HTTP communication. The location data obtainer obtains location data. The location data is obtained at predetermined time intervals. The display controller updates the map. The map is the map displayed on the display. The program causes the communication obtainer to obtain map data corresponding to the location data. The map data is obtained at a predetermined frequency. The predetermined frequency is a frequency corresponding to the distance between a position indicated by location data and a position indicated by other location data that is obtained subsequently. The program causes the display controller to update the map based on map data. The map data is obtained by the communication obtainer.

The display device according to each aspect of the present disclosure may be achieved by a computer. In this case, the control program, which allows the computer to achieve the display device by causing the computer to function as each component (software element) of the display device, and a computer-readable recording medium storing the control program fall within the scope of the present invention.

A display device according to one aspect of the present disclosure includes a communicator, a display, and a controller. The communicator obtains map data. The map data is obtained based on location data about a movable object. The map data is obtained through HTTP communication. The map data is obtained repeatedly. The map data corresponds to the current location of the movable object. The display displays a map. The map indicates the current location of the movable object. The map is displayed based on the location data, the map data, and HTML data. The map is displayed in an HTML form. The HTML form is editable in HTML. The controller performs processing to control each of the communicator and the display. The controller includes a location data obtainer. The location data obtainer obtains the location data about the movable object. The location data obtainer obtains the location data repeatedly. The controller shortens the interval between acquisitions of the map data to a length shorter than the previously set interval. The map data is obtained by the communicator. The controller increases the frequency of map updates to a value higher than the previously set frequency. The map is the map displayed on the display. The interval shortening and the increase in frequency are performed in response to a load decreasing below the previously sensed load. The load is a degree of processing performed by the controller.

In the display device according to one aspect of the present disclosure, the communicator obtains a program. The program causes the map to be updated. The map is the map displayed on the display. The communicator obtains the program through HTTP communication.

In the display device according to one aspect of the present disclosure, the controller includes an interval determiner. The interval determiner determines an interval based on the load, the speed of the movable object, the map scale, and the obtaining time. The interval is a time interval between map updates. The map is the map displayed on the display. The obtaining time is the time taken for the communicator to obtain the map data.

In the display device according to one aspect of the present disclosure, the display displays the map using a web browser.

In the display device according to one aspect of the present disclosure, the communicator communicates with each of a first server and a second server. The second server is a server different from the first server. The communicator obtains the map data and the program. The map data and the program are obtained from the first server. The communicator obtains the HTML data. The HTML data is obtained from the second server. In the HTML data, the structure of a page is written. The page includes the map as an element.

In the display device according to one aspect of the present disclosure, the display displays the map through an application.

A control program according to one aspect of the present disclosure includes a module. A JavaScript file is written in JavaScript. The module is a WebAssembly module. The control program causes a computer to perform processing. The computer includes a communicator, a display, and a controller. The communicator obtains map data. The map data is obtained based on location data about a movable object. The map data is obtained repeatedly. The map data corresponds to the current location of the movable object. The map data is obtained through HTTP communication. The display displays a map. The map indicates the current location of the movable object. The map is displayed based on the location data, the map data, and HTML data. The map is displayed in an HTML form. The HTML form is editable in HTML. The controller performs processing to control each of the display and the communicator. The control program causes the computer to obtain the location data about the movable object repeatedly. The control program causes the computer to shorten the interval between acquisitions of the map data to a length shorter than the previously set interval. The control program causes the computer to increase the frequency of map updates to a value higher than the previously set frequency. The map data is obtained by the communicator. The map is the map displayed on the display. The interval shortening and the increase in frequency are performed in response to a load decreasing below the previously sensed load. The load is a degree of processing performed by the controller.

REFERENCE SIGNS LIST

10 content delivery server
20 web server 100, 100A, 100B, 100C user terminal
101 web browser
110 user terminal communicator
120 user input unit
130 output unit
140 user terminal storage
150 sensor input unit
160 GPS receiver
170 user terminal controller
171 request unit
172 obtaining unit
173 rendering unit
174, 174A, 174B, 174C interval determiner

The invention claimed is:

1. A display device, comprising:
one or more processors; and
a display,
wherein: the one or more processors are configured to obtain map data from a first server and obtain, from a second server different from the first server, Hypertext Markup Language data in which a structure of a webpage including a map as an element is written; and obtain location data at predetermined time intervals,
wherein the display is configured to display, in a web browser, based on the map data obtained from the first server and the Hypertext Markup Language data obtained from the second server, the webpage including the map as an element, the map indicating a position indicated by the location data,
wherein the one or more processors is configured to:
update the map displayed in the web browser in response to the map data being newly obtained from the first server;
with the webpage displayed in the web browser, obtain, from the first server, based on a tag embedded in the webpage, the map data corresponding to the location data obtained at the predetermined time intervals, and
set a time corresponding to an interval to a next update of the map displayed in the web browser, and shortens the time to a length shorter than a previously set time in response to a load on the one or more processors decreasing below a previously sensed load.

2. The display device according to claim 1, wherein the one or more processors are configured to obtain, from the first server, a program to update the map displayed in the web browser, and
the program supports a WebAssembly module to perform parsing to extract, from the map data obtained by the communication obtainer, data usable to update the map displayed in the web browser.

3. A non-transitory recording medium that stores a program for causing a computer to function to
obtain map data from a first server and obtain, from a second server different from the first server, Hypertext Markup Language data in which a structure of a webpage including a map as an element is written,
obtain location data at predetermined time intervals,
cause a display to display, in a web browser, based on the map data obtained from the first server and the Hypertext Markup Language data obtained from the second server, the webpage including the map as an element, the map indicating a position indicated by the location data,
update the map displayed in the web browser in response to the map data being newly obtained from the first server,
with the webpage displayed in the web browser, obtain, from the first server, based on a tag embedded in the webpage, the map data corresponding to the location data obtained at the predetermined time intervals, and
set a time corresponding to an interval to a next update of the map displayed in the web browser, and shortens the time to a length shorter than a previously set time in response to a load on one or more processors decreasing below a previously sensed load.

4. The non-transitory recording medium according to claim 3, wherein
the program is obtained from the first server by the communication obtainer, and
the program supports a WebAssembly module for performing parsing to extract, from the map data obtained by the communication obtainer, data usable to update the map displayed in the web browser.

5. The non-transitory recording medium according to claim 4, wherein
the program includes a JavaScript file written in JavaScript (registered trademark), and
the program causes the map displayed in the web browser to be updated based on rectangle vertex information and polygonal information about a road and a building, and the rectangle vertex information and the polygonal information are each generated from the data extracted in the parsing.

6. The non-transitory recording medium according to claim 3, wherein
the program further causes the display controller to function as a navigator configured to
cause the web browser to display a map of a predetermined area including a current location of a user and a destination as the map being the element included in the webpage,
provide guidance with a sound from the current location of the user to the destination along a guide route, and
in response to each update of the map displayed in the web browser, display the guide route on the updated map.

7. A method of displaying image on a display device, the method being performed by one or more processors, the method comprising:
obtaining map data from a first server and obtain, from a second server different from the first server, Hypertext Markup Language data in which a structure of a webpage including a map as an element is written;
obtaining location data at predetermined time intervals;
causing the display to display, in a web browser, based on the map data obtained from the first server and the Hypertext Markup Language data obtained from the second server, the web page including the map as an element, the map indicating a position indicating a position indicated by the location data;
updating the map displayed in the web browser in response to the map data being newly obtained from the first server;
with the webpage displayed in the web browser, obtaining, from the first server, based on a tag embedded in the webpage, the map data corresponding to the location data obtained at the predetermined time intervals; and
setting a time corresponding to an interval to a next update of the map displayed in the web browser, and shortens the time to a length shorter than a previously set time in response to a load on the one or more processors decreasing below a previously sensed load.

* * * * *